United States Patent
Av-Gay et al.

(10) Patent No.: US 12,478,640 B2
(45) Date of Patent: Nov. 25, 2025

(54) INHALATION OF NITRIC OXIDE FOR TREATING RESPIRATORY DISEASES

(71) Applicant: BEYOND AIR LTD, Rehovot (IL)

(72) Inventors: Yossef Av-Gay, Vancouver (CA); Christopher C. Miller, N. Vancouver, CA (US); David Greenberg, Omer (IL)

(73) Assignee: BEYOND AIR LTD, Rehovot (IL)

( * ) Notice: Subject to any disclaimer, the term of this patent is extended or adjusted under 35 U.S.C. 154(b) by 498 days.

(21) Appl. No.: 17/412,241

(22) Filed: Aug. 25, 2021

(65) Prior Publication Data

US 2022/0047623 A1 Feb. 17, 2022

Related U.S. Application Data

(63) Continuation of application No. 16/879,233, filed on May 20, 2020, now abandoned, which is a continuation of application No. 14/382,815, filed as application No. PCT/IL2013/050215 on Mar. 7, 2013, now abandoned.

(60) Provisional application No. 61/607,686, filed on Mar. 7, 2012.

(51) Int. Cl.
| | | |
|---|---|---|
| A61K 33/00 | (2006.01) | |
| A61B 5/00 | (2006.01) | |
| A61B 5/083 | (2006.01) | |
| A61B 5/145 | (2006.01) | |
| A61K 9/00 | (2006.01) | |
| A61M 16/00 | (2006.01) | |
| A61M 16/12 | (2006.01) | |

(52) U.S. Cl.
CPC ............ *A61K 33/00* (2013.01); *A61B 5/0833* (2013.01); *A61B 5/0836* (2013.01); *A61B 5/14507* (2013.01); *A61B 5/14542* (2013.01); *A61B 5/4244* (2013.01); *A61K 9/007* (2013.01); *A61M 16/0003* (2014.02); *A61M 16/12* (2013.01); *A61M 16/122* (2014.02); *A61M 2202/0007* (2013.01); *A61M 2202/0275* (2013.01); *A61M 2205/3303* (2013.01); *A61M 2230/202* (2013.01); *A61M 2230/205* (2013.01); *A61M 2230/207* (2013.01); *A61M 2230/432* (2013.01)

(58) Field of Classification Search
CPC ..... A61K 33/00; A61K 9/007; A61M 16/003; A61M 16/122; A61M 16/12; A61M 2202/0007; A61M 2202/0275; A61M 2205/3303; A61M 2230/202; A61M 2230/205; A61M 2230/207; A61M 2230/432; A61B 5/0833; A61B 5/0836; A61B 5/14507; A61B 5/14542; A61B 5/4244
See application file for complete search history.

(56) References Cited

U.S. PATENT DOCUMENTS

| | | |
|---|---|---|
| 3,991,761 A | 11/1976 | Cocozza et al. |
| 4,889,116 A | 12/1989 | Taube et al. |
| 4,954,526 A | 9/1990 | Keefer |
| 5,035,237 A | 7/1991 | Newell et al. |
| 5,038,772 A | 8/1991 | Kolbe et al. |
| 5,039,705 A | 8/1991 | Keefer et al. |
| 5,155,137 A | 10/1992 | Keefer et al. |
| 5,208,233 A | 5/1993 | Keefer et al. |
| 5,285,794 A | 2/1994 | Lynch et al. |
| 5,351,683 A | 10/1994 | Chiesi et al. |
| 5,352,461 A | 10/1994 | Feldstein et al. |
| 5,405,919 A | 4/1995 | Keefer et al. |
| 5,427,797 A | 6/1995 | Frostell et al. |
| 5,437,270 A | 8/1995 | Braithwaite |
| 5,447,150 A | 9/1995 | Bacon et al. |
| 5,458,135 A | 10/1995 | Patton et al. |
| 5,469,750 A | 11/1995 | Lloyd et al. |
| 5,503,144 A | 4/1996 | Bacon |
| 5,503,852 A | 4/1996 | Steiner et al. |

(Continued)

FOREIGN PATENT DOCUMENTS

| | | |
|---|---|---|
| AU | 4090599 A | 12/1999 |
| AU | 3320101 A | 8/2001 |

(Continued)

OTHER PUBLICATIONS

Inhaled NO for the Treatment of COVID-19 Caused by SARS-COV-2 (US Trial), Clinical Trials.gov. Retrieved from the Internet May 28, 2020. <<https://clinicaltrials.gov/ct2/show/NCT04397692?term=beyond+air&draw=2&rank=1>>.

(Continued)

*Primary Examiner* — Alma Pipic

(74) *Attorney, Agent, or Firm* — Elmore Patent Law Group, PC; Joseph C. Zucchero; Carolyn S. Elmore

(57) ABSTRACT

A method of treating a human subject which is effected by intermittent inhalation of gaseous nitric oxide at a concentration of at least 160 ppm is disclosed. The method can be utilized for treating a human subject suffering from, or prone to suffer from, a disease or disorder that is manifested in the respiratory tract, or from a disease or disorder that can be treated via the respiratory tract. The disclosed method can be effected while monitoring one or more of on-site and off-site parameters such as vital signs, methemoglobin levels, pulmonary function parameters, blood chemistry and hematological parameters, blood coagulation parameters, inflammatory marker levels, liver and kidney function parameters and vascular endothelial activation parameters, such that no substantial deviation from a baseline in seen in one or more of the monitored parameters.

2 Claims, 8 Drawing Sheets

(56) References Cited

U.S. PATENT DOCUMENTS

| | | |
|---|---|---|
| 5,509,404 A | 4/1996 | Lloyd et al. |
| 5,522,385 A | 6/1996 | Lloyd et al. |
| 5,525,357 A | 6/1996 | Keefer et al. |
| 5,536,723 A | 7/1996 | Loscalzo et al. |
| 5,558,083 A | 9/1996 | Bathe et al. |
| 5,574,068 A | 11/1996 | Stamler et al. |
| 5,632,981 A | 5/1997 | Saavedra et al. |
| 5,651,359 A | 7/1997 | Bougamont et al. |
| 5,664,560 A | 9/1997 | O'Mahony et al. |
| 5,673,686 A | 10/1997 | Villax et al. |
| 5,678,538 A | 10/1997 | Drought |
| 5,694,919 A | 12/1997 | Rubsamen et al. |
| 5,735,263 A | 4/1998 | Rubsamen et al. |
| 5,740,794 A | 4/1998 | Smith et al. |
| 5,785,049 A | 7/1998 | Smith et al. |
| 5,797,392 A | 8/1998 | Keldmann et al. |
| 5,823,180 A | 10/1998 | Zapol et al. |
| 5,829,434 A | 11/1998 | Ambrosio et al. |
| 5,840,279 A | 11/1998 | Narodylo et al. |
| 5,855,564 A | 1/1999 | Ruskewicz |
| 5,881,719 A | 3/1999 | Gottenauer et al. |
| 5,881,721 A | 3/1999 | Bunce et al. |
| 5,885,621 A | 3/1999 | Head et al. |
| 5,983,893 A | 11/1999 | Wetterlin |
| 5,993,783 A | 11/1999 | Eljamal et al. |
| 6,026,808 A | 2/2000 | Armer et al. |
| 6,026,809 A | 2/2000 | Abrams et al. |
| 6,056,169 A | 5/2000 | Bruna et al. |
| 6,071,497 A | 6/2000 | Steiner et al. |
| 6,071,498 A | 6/2000 | Narodylo et al. |
| 6,089,229 A | 7/2000 | Bathe et al. |
| 6,095,141 A | 8/2000 | Armer et al. |
| 6,120,752 A | 9/2000 | Oliver et al. |
| 6,132,394 A | 10/2000 | Lankinen |
| 6,170,717 B1 | 1/2001 | Giovanni et al. |
| 6,182,655 B1 | 2/2001 | Keller et al. |
| 6,200,558 B1 | 3/2001 | Saavedra et al. |
| 6,230,707 B1 | 5/2001 | Hoerlin |
| 6,232,336 B1 | 5/2001 | Hrabie et al. |
| 6,237,589 B1 | 5/2001 | Denyer et al. |
| 6,331,318 B1 | 12/2001 | Milstein |
| 6,359,182 B1 | 3/2002 | Stamler et al. |
| 6,367,471 B1 | 4/2002 | Genosar et al. |
| 6,391,895 B1 | 5/2002 | Towart et al. |
| 6,397,660 B1 | 6/2002 | Kikuchi et al. |
| 6,397,838 B1 | 6/2002 | Zimlich, Jr. et al. |
| 6,427,688 B1 | 8/2002 | Ligotke et al. |
| 6,428,771 B1 | 8/2002 | Steiner et al. |
| 6,482,391 B1 | 11/2002 | Hills et al. |
| 6,488,027 B1 | 12/2002 | Moulin |
| 6,511,991 B2 | 1/2003 | Hrabie et al. |
| 6,528,096 B1 | 3/2003 | Musa et al. |
| 6,536,429 B1 | 3/2003 | Pavlov et al. |
| 6,561,186 B2 | 5/2003 | Casper et al. |
| 6,581,599 B1 | 6/2003 | Stenzler |
| 6,612,306 B1 | 9/2003 | Mault et al. |
| 6,655,379 B2 | 12/2003 | Clark et al. |
| 6,659,364 B1 | 12/2003 | Humberstone et al. |
| 6,673,338 B1 | 1/2004 | Arnold et al. |
| 6,758,214 B2 | 7/2004 | Fine et al. |
| 6,901,926 B2 | 6/2005 | Yamamoto et al. |
| 6,901,929 B2 | 6/2005 | Burr et al. |
| 6,923,175 B2 | 8/2005 | Poole et al. |
| 6,945,953 B2 | 9/2005 | Wright |
| 6,962,151 B1 | 11/2005 | Knoch et al. |
| 7,025,869 B2 | 4/2006 | Fine et al. |
| 7,040,313 B2 | 5/2006 | Fine et al. |
| 7,077,125 B2 | 7/2006 | Scheuch |
| 7,122,018 B2 | 10/2006 | Miller et al. |
| 7,132,115 B2 | 11/2006 | Musa et al. |
| 7,399,528 B2 | 7/2008 | Caponetti et al. |
| 7,425,218 B2 | 9/2008 | Keefer et al. |
| 7,464,706 B2 | 12/2008 | Steiner et al. |
| 7,516,742 B2 | 4/2009 | Stenzler et al. |
| 7,569,559 B2 | 8/2009 | Arnold et al. |
| 7,763,283 B2 | 7/2010 | Batchelor et al. |
| 7,766,012 B2 | 8/2010 | Scheuch et al. |
| 7,829,553 B2 | 11/2010 | Arnold et al. |
| 7,968,664 B2 | 6/2011 | Hrabie et al. |
| 8,066,904 B2 | 11/2011 | Rounbehler et al. |
| 8,093,343 B2 | 1/2012 | Hrabie et al. |
| 8,101,589 B2 | 1/2012 | Arnold et al. |
| 8,101,658 B2 | 1/2012 | Benedini et al. |
| 8,158,187 B2 | 4/2012 | Chen et al. |
| 8,221,800 B2 | 7/2012 | Fine et al. |
| 8,273,828 B2 | 9/2012 | Chen et al. |
| 8,371,296 B2 | 2/2013 | Fine et al. |
| 8,387,895 B2 | 3/2013 | Stangl |
| 8,518,457 B2 | 8/2013 | Miller et al. |
| 8,613,958 B2 | 12/2013 | Fine |
| 8,633,177 B2 | 1/2014 | Miranda et al. |
| 2002/0185126 A1 | 12/2002 | Krebs et al. |
| 2003/0094173 A1 | 5/2003 | Burr et al. |
| 2003/0125633 A1 | 7/2003 | Hartings et al. |
| 2003/0131849 A1 | 7/2003 | Figley et al. |
| 2004/0028753 A1 | 2/2004 | Hedenstierna et al. |
| 2004/0096403 A1 | 5/2004 | Steiner et al. |
| 2004/0131703 A1 | 7/2004 | Bach et al. |
| 2004/0261796 A1 | 12/2004 | Butler et al. |
| 2005/0036949 A1 | 2/2005 | Tucker et al. |
| 2005/0069595 A1 | 3/2005 | Chen et al. |
| 2005/0191372 A1 | 9/2005 | Stenzler et al. |
| 2005/0255178 A1 | 11/2005 | Bloch et al. |
| 2006/0207594 A1 | 9/2006 | Miller et al. |
| 2007/0086954 A1 | 4/2007 | Miller |
| 2007/0104653 A1 | 5/2007 | Miller et al. |
| 2007/0116785 A1 | 5/2007 | Miller |
| 2007/0144515 A1 | 6/2007 | Stenzler et al. |
| 2007/0275100 A1 | 11/2007 | Miller |
| 2008/0171021 A1 | 7/2008 | Bach et al. |
| 2008/0193566 A1 | 8/2008 | Miller et al. |
| 2008/0287861 A1 | 11/2008 | Stenzler et al. |
| 2009/0304604 A1 | 12/2009 | Bauer et al. |
| 2010/0040703 A1 | 2/2010 | Miller et al. |
| 2011/0154241 A1 | 6/2011 | Skidmore et al. |
| 2011/0220103 A1 | 9/2011 | Fine et al. |
| 2011/0226241 A1 | 9/2011 | Stenzler et al. |
| 2012/0211005 A1 | 8/2012 | Bauer et al. |
| 2015/0034084 A1 | 2/2015 | Av-Gay et al. |
| 2015/0044305 A1 | 2/2015 | Av-Gay et al. |
| 2015/0072023 A1 | 3/2015 | Greenberg et al. |
| 2015/0272988 A1* | 10/2015 | Av-Gay |
| 2016/0022731 A1 | 1/2016 | Av-Gay et al. |
| 2016/0279165 A1 | 9/2016 | Av-Gay et al. |
| 2017/0143758 A1 | 5/2017 | Greenberg et al. |
| 2018/0243526 A1 | 8/2018 | Av-Gay et al. |
| 2020/0246573 A1 | 8/2020 | Av-Gay et al. |

FOREIGN PATENT DOCUMENTS

| | | |
|---|---|---|
| CA | 2298448 A1 | 10/1999 |
| CA | 2563493 A1 | 11/2005 |
| CA | 2565230 A1 | 11/2005 |
| EP | 0707862 A1 | 4/1996 |
| EP | 0799067 A1 | 10/1997 |
| EP | 0910421 A2 | 4/1999 |
| EP | 1196146 A2 | 4/2002 |
| EP | 1258264 A2 | 11/2002 |
| EP | 1522325 A1 | 4/2005 |
| EP | 1981572 A2 | 10/2008 |
| EP | 2937089 A1 | 10/2015 |
| GB | 2242134 A | 9/1991 |
| GB | 2407042 A | 4/2005 |
| WO | 9210228 A1 | 6/1992 |
| WO | 9300951 A1 | 1/1993 |
| WO | 9419042 A1 | 9/1994 |
| WO | 9503846 A1 | 2/1995 |
| WO | 9609085 A1 | 3/1996 |
| WO | 9632152 A1 | 10/1996 |
| WO | 9700703 A1 | 1/1997 |
| WO | 9702061 A1 | 1/1997 |
| WO | 9720589 A1 | 6/1997 |
| WO | 9848873 A1 | 11/1998 |
| WO | 9852634 A1 | 11/1998 |

(56) References Cited

FOREIGN PATENT DOCUMENTS

| | | |
|---|---|---|
| WO | 9966903 A2 | 12/1999 |
| WO | 0010541 A1 | 3/2000 |
| WO | 0035523 A1 | 6/2000 |
| WO | 0053158 A1 | 9/2000 |
| WO | 0107107 A2 | 2/2001 |
| WO | 0134232 A1 | 5/2001 |
| WO | 0149350 A1 | 7/2001 |
| WO | 0168169 A1 | 9/2001 |
| WO | 0178693 A2 | 10/2001 |
| WO | 0193933 A2 | 12/2001 |
| WO | 0241924 A1 | 5/2002 |
| WO | 02089880 A2 | 11/2002 |
| WO | 02102444 A1 | 12/2002 |
| WO | 03035030 A1 | 5/2003 |
| WO | 03035137 A2 | 5/2003 |
| WO | 03053501 A1 | 7/2003 |
| WO | 03095012 A1 | 11/2003 |
| WO | 2004020029 A1 | 3/2004 |
| WO | 2004024156 A1 | 3/2004 |
| WO | 2004026380 A2 | 4/2004 |
| WO | 2004041340 A2 | 5/2004 |
| WO | 2004082633 A2 | 9/2004 |
| WO | 2005110441 A2 | 11/2005 |
| WO | 2006006963 A2 | 1/2006 |
| WO | 2007057763 A2 | 5/2007 |
| WO | 2007091267 A2 | 8/2007 |
| WO | 2008095312 A1 | 8/2008 |
| WO | 2010097119 A1 | 9/2010 |
| WO | 2011004476 A1 | 1/2011 |
| WO | 2013132497 A1 | 9/2013 |
| WO | 2013132498 A2 | 9/2013 |
| WO | 2013132499 A1 | 9/2013 |
| WO | 2013132500 A1 | 9/2013 |
| WO | 2013132503 A1 | 9/2013 |
| WO | 2014136111 A2 | 9/2014 |
| WO | 2015037002 A2 | 3/2015 |
| WO | 2016030760 A2 | 3/2016 |
| WO | 2017130066 A1 | 8/2017 |

OTHER PUBLICATIONS

International Preliminary Report on Patentability Dated May 14, 2015 From the International Bureau of WIPO Re. Application No. PCT/IL2013/050212.
International Preliminary Report on Patentability dated May 14, 2020 from the International Bureau of WIPO for International App. No. PCT/US2018/058956.
International Preliminary Report on Patentability dated May 14, 2020 from the International Bureau of WIPO for International App. No. PCT/US2018/058962.
International Preliminary Report on Patentability Dated Sep. 18, 2014 From the International Bureau of WIPO Re. Application No. PCT/IL2013/050211.
International Preliminary Report on Patentability Dated Sep. 18, 2014 From the International Bureau of WIPO Re. Application No. PCT/IL2013/050213.
International Preliminary Report on Patentability Dated Sep. 18, 2014 From the International Bureau of WIPO Re. Application No. PCT/IL2013/050215.
International Preliminary Report on Patentability Dated Sep. 18, 2014 From the International Bureau of WIPO Re. Application No. PCT/IL2013/050219.
International Search Report and the Written Opinion Dated Jul. 11, 2013 From the International Searching Authority Re. Application No. PCT/IL2013/0502219.
International Search Report and the Written Opinion Dated Jul. 3, 2014 From the International Searching Authority Re. Application No. PCT/IL2014/050225.
International Search Report and the Written Opinion Dated Mar. 3, 2015 From the International Searching Authority Re. Application No. PCT/IL2014/050811.

International Search Report and the Written Opinion Dated Jun. 21, 2013 From the International Searching Authority Re. Application No. PCT/IL2013050211.
International Search Report and the Written Opinion Dated Jun. 26, 2013 From the International Searching Authority Re. Application No. PCT/IL2013/050213.
International Search Report and the Written Opinion Dated Jun. 26, 2013 From the International Searching Authority Re. Application No. PCT/IL2013/050215.
Invitation to Pay Additional Fees Dated Dec. 16, 2014 From the International Searching Authority Re. Application No. PCT/IL2014/050811.
Press release (and data) May 23, 2018: AIT Therapeutics Presented Data from Its Inhaled Nitric Oxide Study in Patients Infected with Mycobacterium Abscessus Complex (MABSC) at the 2018 American Thoracic Society Conference.
Press release May 15, 2018: AIT Therapeutics to Present Data from Its Inhaled Nitric Oxide Study in Patients Infected with Mycobacterium Abscessus Complex at the 2018 American Thoracic Society Conference.
Restriction Official Action Dated Jun. 19, 2015 From U.S. Appl. No. 14/382,829.
CF Foundation "Annual Report 2013", Cystic Fibrosis Foundation, CFF, 28, Dec. 2013, 31.
"Beyond Air Receives Approval from Health Canada to Study Nitric Oxide Generated and Delivered by the LungFit™ in COVID-19 Patients", Press Release, May 26, 2020. <<https://www.beyondair.net/investors/news-events/pressreleases/detail/105/beyond-air-receives-approval-from-health-canada-to-study>>.
Adatia, et al., "Inhaled Nitric Oxide and Hemodynamic Evaluation of Patients With Pulmonary Hypertension Before Transplantation", Journal of the American College of Cardiology, vol. 25(7), Jun. 1995, 1656-1664.
Albert, J. et al., "Prolonged exposure to inhaled nitric oxide does not affect haemostasis in piglets", Intensive Care Medicine, Springer, Berlin, DE, vol. 33, No. 9, May 12, 2007, 1594-1601.
Bernasconi, A. et al., "Inhaled nitric oxide applications in paediatric practice", Images Paediatr Cardiol., Jan.-Mar. 2002; 4(1)4-29.
Boon, et al., "Primary Ciliary Dyskinesia, An Orphan Disease", European Journal of Pediatrics, 172(2), Feb. 2013, 151-162.
Borgese, N. et al., "Concentration of NADH-Cytochrome B5 Reductase in Erythrocytes of Normal and Methaemoglobinemic Individuals Measured With A Quantitative Radioimmunoblotting Assay", Journal of Clinical Investigation, 80, Nov. 1987, 1296-1302.
Botha, et al., "Inhaled Nitric Oxide for Modulation of Ischemia-Reperfusion Injury in Lung Transplantation", The Journal of Heart and Lung Transplantation, vol. 26, No. 11, 2007, 1199-1205.
Cannon, III, et al., "Effects of inhaled nitric oxide on regional blood flow are consistent with intravascular nitric oxide delivery", The Journal of Clinical Investigation, vol. 108, No. 2, 2001, 279-287.
Deppisch, Caroline et al., "Gaseous nitric oxide to treat antibiotic resistant bacterial and fungal lung infections in patients with cystic fibrosis: a phase I clinical study", Infection, Springer, Berlin/Heidelberg, vol. 44, No. 4, Feb. 9, 2016, 513-520.
Diblasi, R. M. et al., "Evidence-based clinical practice guideline: Inhaled nitric oxide for neonates with acute hypoxic respiratory failure", Respiratory Care, Daedalus Enterprises; vol. 55(12), Dec. 1, 2010, 1717-1745.
Dooring, et al., "Treatment of Lung Infection in Patients With Cystic Fibrosis: Current and Future Strategies", Journal of Cystic Fibrosis, 11, Published Online, Nov. 2012, 461-479.
Esther Jr., C. R. et al., "Chronic Mycobacterium abscessus infection and lung function decline in cystic fibrosis", J. of Cystic Fibrosis, vol. 9, 2010, 117-123.
Friesen, et al., "C-Reactive Protein in Acute Pulmonary Exacerbations of Patients With Cystic Fibrosis", Pediatric Pulmonary, 20, 1995, 215-219.
Fujimoto, K. et al., "Airway Inflammation During Stable and Acutely Exacerbated Chronic Obstructive Pulmonary Disease", Eur Respir J., 25(4), Apr. 2005, 640-646.
Ghaffari, A. et al., "A Direct Nitric Oxide Gas Delivery System for Bacterial and Mammalian Cell Cultures", Nitric Oxide, vol. 12, 2005, 129-140.

(56) References Cited

OTHER PUBLICATIONS

Ghaffari, A. et al., "Efficacy of Gaseous Nitric Oxide in the Treatment of Skin and Soft Tissue Infections", Wound Repair and Regeneration, vol. 15, 2007, 368-377.
Griffiths, M. J. et al., "Inhaled Nitric Oxide Therapy in Adults", New England Journal of Medicine, 2005, 2683-2695.
Hergott, C. A. et al., "Effects of Continuous Vs Pulsed Inhaled Nitric Oxide in A Rat Model of Pseudomonas Aeruginosa Pneumonia", American Journal of Respiratory and Critical Care Medicine (173), Thematic Poster Session, AI 23, ALI: Basic Investigation, Poster Board #E30, Abstract A TS06L_2834, Publication p. AI35, San Diego, CA, USA, May 21, 2006.
Hicks, et al., Cancer, vol. 97, Issue 10, Apr. 30, 2003, 2576-2587.
Hurford, W. "Nitric Oxide as A Bactericidal Agent: Is the Cure Worse Than the Disease?", Respiratory Care, 50(11), Nov. 2005, 1428-1429.
Jacobs, B. R. et al., "Aerosolized soluble nitric oxide donor improves oxygenation and pulmonary hypertension in acute lung injury", American Journal of Respiratory and Critical Care Medicine, vol. 158(5), Pt1, Nov. 1998, 1536-1542.
Kelley, et al., "Inducible Nitric Oxide Synthase Expression Is Reduced in Cystic Fibrosis Murine and Human Airway Epithelial Cells", Journal of Clinical Investigation, 102(6), Sep. 1998, 1200-1207.
Lucas, et al., "Overcoming Challenges in the Management of Primary Ciliary Dyskinesia: The UK Model", Paediatric Respiratory Reviews, Epub Ahead of Print, Jun. 11, 2013, 4P.
Mcmullin, B. et al., "The Antimicrobial Effect of Nitric Oxide on the Bacteria That Cause Nosocomial Pneumonia in _Mechanically Ventilated Patients in the Intensive Care Unit", Respiratory Care, 50(11), Nov. 2005, 1451-1456.
Meade, et al., "A Randomized Trial of Inhaled Nitric Oxide to Prevent Ischemia-Reperfusion Injury after Lung Transplantation", American Journal of Respiratory and Critical Care Medicine [online], 2003 [Retrieved on Dec. 24, 2018], vol. 167, Retrieved from the Internet, 1483-1489.
Miller, "The Antibacterial Role of Exogenous Nitric Oxide Gas", Thesis Submitted in Partial Fulfillment of the Requirements for the Degree of Doctor of Philosophy in the Faculty of Graduate Studies, Department of Experimental Medicine, University of British Columbia, CA, 193 P., Nov. 2004.
Miller, C. et al., "A phase I clinical study of inhaled nitric oxide in healthy adults", Journal of Cystic Fibrosis, 11(4), 2012, 324-331.
Miller, C. et al., "Inhaled nitric oxide decreases the bacterial load in a rat model of Pseudomonas aeruginosa pneumonia", Journal of Cystic Fibrosis: Official Journal of the European Cystic Fibrosis Society Dec. 2013, vol. 12, No. 6, Dec. 2013, 817-820.
Miller, C. C. et al., "Gaseous nitric oxide bactericidal activity retained during intermittent highdose short duration exposure", Nitric Oxide: Biology and Chemistry, Academic Press, Amsterdam, NL, vol. 20(1), Feb. 1, 2009, 16-23.
Miller, C. C. et al., "Innate Protection of Mycobacterium Smegmatis Against the Antimicrobial Activity of Nitric Oxide Is Provided by Mycothiol", Antimicrobial Agents and Chemotherapy, 51(9), Sep. 2007, 3364-3366.
Miller, C. C. et al., "Methemoglobin Production in Normal Adults Inhaling Intermittent High Concentrations of Nitric Oxide", University of British Columbia, North Vancouver, BC, Canada, Control ID: 492723, Respiratory Care, 53(11), 2008, 1530 (Abstract).
Miller, C. C. et al., "Treatment of Chronic Nonhealing Leg Ulceration With Gaseous Nitric Oxide: A Case Study", J. Cutan. Med. Surg., vol. 8(4), Jul.-Aug. 2004, 233-238.
Ngan, et al., "The Relationship of Systemic Inflammation to Prior Hospitalization in Adult Patients With Cystic Fibrosis", BMC Pulmonary Medicine, 12(3), Feb. 14, 2012, 1-7.
Patel, et al., "Effect of inhaled nitric oxide on respiratory mechanics in ventilated infants with RSV bronchiolitis", Intensive Care Medicine, vol. 25, 1999, 81-87.
Piancentini, et al., "Nasal Nitric Oxide Levels in Healthy Pre-School Children", Pedriatic Allergy and Immunology, 21(8), Dec. 2010, 1139-1145.
Pifferi, et al., "Up to Date on Primary Ciliary Dyskinesia in Children", Early Human Development, Epub, 4 P, Aug. 2013.
Rawat, et al., "Comparative Analysis of Mutants in the Mycothiol Biosynthesis Pathway in Mycobacterium Smegmatis", Biochemical and Biophysical Research Communications, BBRC, 363, 2007, 71-76.
Rawat, et al., "Mycothiol-Deficient Mycobacterium Smegmatis Mutants Are Hypersensitive to Alkylating Agents, Free Radicals, and Antibiotics", Antimicrobial Agents and Chemotherapy, 46(11), Nov. 2002, 3348-3355.
Rawat, et al., "Mycothiol-Dependent Proteins in Actinomycetes", FEMS Microbiology Reviews, 31(3), Apr. 2007, 278-292.
Rawat, et al., "Targeted Mutagenesis of the Mycobacterium Smegmatis MCA Gene, Encoding A Mycothiol-Dependent Detoxification Protein", Journal of Bacteriology, 186(18), Sep. 2004, 6050-6058.
Regev-Shoshani, et al., "Gaseous Nitric Oxide Reduces Influenza Infectivity In Vitro", Nitric Oxide, 31, May 31, 2013, 48-53.
Regev-Shoshani, et al., "Slow Release of Nitric Oxide From Charged Catheters and Its Effect on Biofilm Formation by *Escherichia coli*", Antimicrobial Agents and Chemotherapy, 54(1), Jan. 2010, 273-279.
Schaefer, A. L. et al., "Infrared Detection and Nitric Oxide Treatment of Bovine Respiratory Disease", Online J. Vet. Res., OJVR, vol. 10(1), 2006, 7-16.
Schutz, et al., Eur. Respir. J., 2010, 1460-1481.
Shoemark, et al., "Bronchial and Peripheral Airway Nitric Oxide in Primary Ciliary Dyskinesia and Bronchiectasis", Respiratory Medicine, 103(5), May 2009, 700-706.
Tsukahara, et al., "Biomarkers for Oxidative Stress: Clinical Application in Pediatric Medicine", Current Medicinal Chemistry, 14(3), Jan. 1, 2007, 339-351.
Ung, et al., "Mycothiol-Dependent Mycobacterial Response to Oxidative Stress", FEMS Letters, 580(11), May 2006, 2712-2716.
Voter, K. Z. et al., "Diagnosis of Cystic Fibrosis", Clinical Reviews of Allergy & Immunology, Clin. Rev. Allerg. Immunol, 35(3) online, 2008, 100-106.
Welliver, Pediatr Infect Dis J, vol. 22, No. 2, 2003, S6-S12.
Westfelt, et al., "Conversion of inhaled nitric oxide to nitrate in man", British Journal of Pharmacology, vol. 114, 1995, 1621-1624.
Yaacoby-Bianu, K. et al., "Compassionate Nitric Oxide Adjuvant Treatment of Persistent Mycobacterium Infection in Cystic Fibrosis Patients", Pediatr Infect Dis J. (Pre-print version), doi: 10.1097/INF.0000000000001780 (printed version—PMID: 28885458).
Young, J. D. et al., "Kinetics of Methaemoglobin and Serum Nitrogen Oxide Production During Inhalation of Nitric Oxide in Volunteers", British Journal of Anaesthesia, 76, 1996, 652-656.
Young, J. D. et al., "Methemoglobin Production in Normal Adults Inhaling Low Concentrations of Nitric Oxide", Intensive Care Medicine, 20(8), Nov. 1994, 581-584.

\* cited by examiner background art FIG. 1A
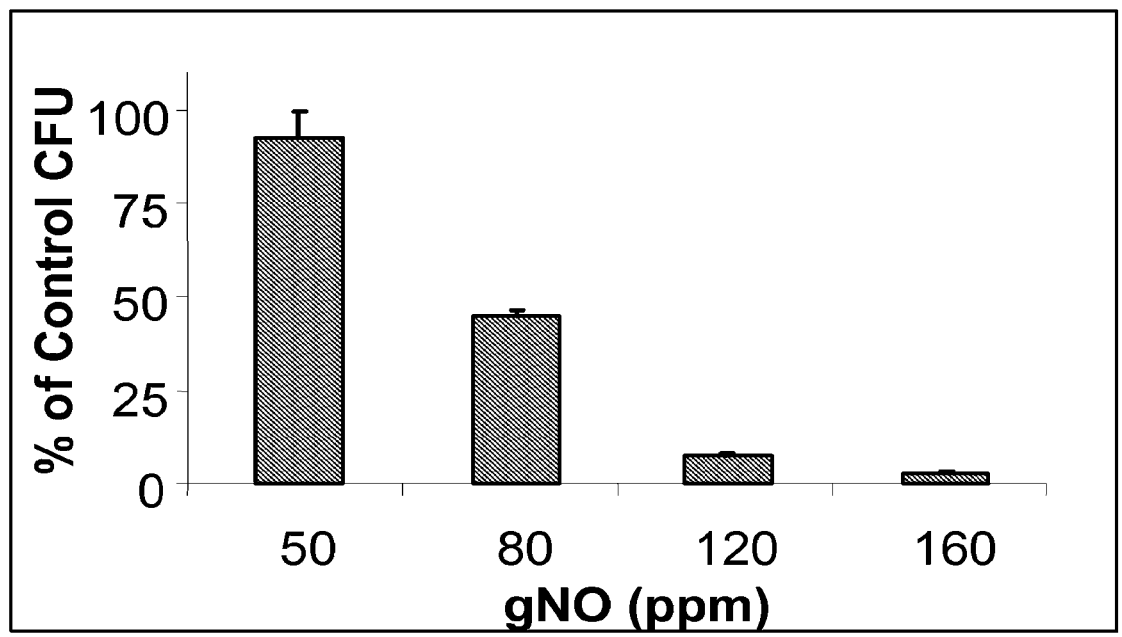
FIG. 1B
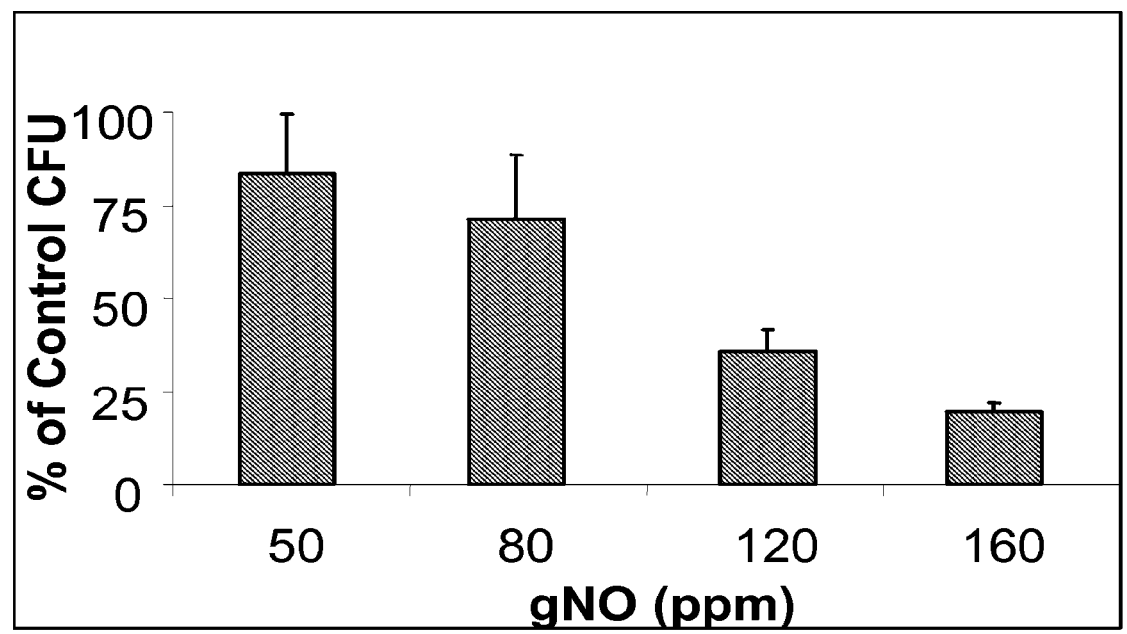

FIG. 2A  (Background Art)

Continuous exposure to gNO at 160 ppm and 800 ppm

- Control
- 160ppm NO
- 800ppm NO

FIG. 2B

Intermittent exposure to gNO at 160 ppm

- Control
- Intermittent 160ppm
- 1 30min. dose of 160ppm
- Nitric oxide

FIG. 2C

HPAI Avian Influenza H7N3

- Control
- 160ppm NO

INHALATION OF NITRIC OXIDE FOR TREATING RESPIRATORY DISEASES

RELATED APPLICATIONS

This application is a continuation of U.S. application Ser. No. 16/879,233 filed on May 20, 2020, which is a continuation of U.S. application Ser. No. 14/382,815, filed on Sep. 4, 2014, which is a National Phase of PCT Application No. PCT/IL2013/050215 having International filing date of Mar. 7, 2013, which claims the benefit of priority under 35 USC§ 119(e) of U.S. Provisional Patent Application No. 61/607,686 filed on Mar. 7, 2012. The contents of the above applications are all incorporated by reference as if fully setforth herein in their entirety.

FIELD AND BACKGROUND OF THE INVENTION

The present invention, in some embodiments thereof, relates to therapy, and more particularly, but not exclusively, to methods and devices for treating respiratory diseases by inhalation of gaseous nitric oxide.

Nitric oxide (NO) is a small lipophilic signaling molecule with a small stokes radius and a molecular weight of 30 grams/mol that enables it to cross the glycolipid cell plasma membrane into the cytosol readily and rapidly. NO has an unpaired electron available in its outer orbit that characterizes it as a free radical. NO has been shown to play a critical role in various bodily functions, including the vasodilatation of smooth muscle, neurotransmission, regulation of wound healing and immune responses to infections such as caused by bactericidal action directed toward various organisms. NO has been demonstrated to play an important role in wound healing through vasodilatation, angiogenesis, anti-inflammatory and antimicrobial action.

NO is a common air pollutant and is present in concentrations of 150-650 ppm in cigarette smoke and up to 1200 ppm in cigar and pipe smoke. The National Institute for Occupational Safety and Health (OSHA) and the Environmental Protection Agency have given an inhalation threshold limit value (TLV) as a time-weighted average (TWA) of 25 ppm for NO. The TLV-TWA is the concentration to which a person's respiratory system may be exposed continuously throughout a normal work week without adverse effects and, when represented in ppm hours units, is calculated to be 200 ppm hours. This level is a time-weighted average, that is, the average level of NO should be less than 25 ppm; however, brief exposures to higher concentrations are allowed.

NO is produced by the innate immune response in organs and cells exposed to bacterial and viral infections. These include, among others, the nasopharyngeal airway, lungs and circulating neutrophils and macrophages. NO is also a highly reactive microbicidal free radical that possesses antimicrobial activity against broad range of bacteria, parasites, fungi and viruses. The pore diameter in the cell walls of the microorganisms through which the NO molecule must pass to affect these pathogens is approximately five times wider so that there are few barriers to NO cell penetration. NO is therefore an essential part of the innate immune response. In addition, NO is one of the smallest, yet one of the most important, biological signaling molecules in mammals.

Other than being a well-established direct antimicrobial agent, it has been hypothesized that the antimicrobial and cellular messenger regulatory properties of NO, delivered in an exogenous gaseous form, might easily enter the pulmonary milieu and be useful in optimizing the treatment of uncontrolled pulmonary disease with specific actions directed at reducing bacterial burden, reducing inflammation and improving clinical symptoms.

Some respiratory disorders and physiological conditions can be treated by inhalation of gaseous nitric oxide (gNO). The use of gNO by inhalation can prevent, reverse, or limit the progression of disorders such as acute pulmonary vasoconstriction, traumatic injury, aspiration or inhalation injury, fat embolism in the lung, acidosis, inflammation of the lung, adult respiratory distress syndrome, acute pulmonary edema, acute mountain sickness, post cardiac surgery, acute pulmonary hypertension, persistent pulmonary hypertension of a newborn, perinatal aspiration syndrome, haline membrane disease, acute pulmonary thromboembolism, heparin-protamine reactions, sepsis, asthma and status asthmaticus or hypoxia. Inhaled gNO can also be used to treat cystic fibrosis (CF), chronic pulmonary hypertension, bronchopulmonary dysplasia, chronic pulmonary thromboembolism and idiopathic or primary pulmonary hypertension or chronic hypoxia.

From the toxicological aspect, NO has a half-life in the body of less than 6 seconds and a radius of action of approximately 200 microns from its site of origin, beyond which it is inactivated through binding to sulfhydryl groups of cellular thiols or by nitrosylation of the heme moieties of hemoglobin to form methemoglobin (MetHb). MetHb reductase reduces NO to nitrates in the blood serum. Nitrate has been identified as the predominant nitric oxide metabolite excreted in the urine, accounting for more than 70% of the nitric oxide dose inhaled. Nitrate is cleared from the plasma by the kidney at rates approaching the rate of glomerular filtration. Blood levels of MetHb in healthy humans are typically less than 2%.

Potential side effects of high dose NO treatment hence include the binding of NO to hemoglobin and the formation of MetHb, which could lead to decreased oxygen transport, and the capacity of NO to act as a nitrosylating agent on proteins and other cell constituents. Formation of MetHb and increased levels thereof have been observed in previous studies of gNO inhalation by healthy human individuals, wherein inhalation of gNO at 128 ppm for 3 hours and at 512 ppm for 55 minutes has been reported to drive the levels of MetHb over the safe threshold of 5% [Borgese N. et al., *J. Clin. Invest.*, 1987, 80, 1296-1302; Young J. D. et al., *Intensive Care Med.*, 1994, 20, 581-4 and Young J. D. et al., *Brit. J. Anaesthesia*, 1996, 76, 652-656].

Thus, concerns have been raised regarding the potential use of NO as a therapeutic agent in various clinical scenarios. To date, studies indicate that acute pulmonary injury, pulmonary edema, hemorrhage, changes in surface tension of surfactant, reduced alveolar numbers and airway responsiveness may be caused by high airway levels of NO, $NO_2$ and other oxides of nitrogen [Hurford W., *Resp. Care*, 2005, 50, 1428-9].

Several animal studies conducted in order to evaluate the safety window for gNO exposure were reported on the Primary Medical Review of NDA 20-845 (INOmax nitric oxide gas). Included in these reports is the study referred to as RDR-0087-DS, wherein groups of 10 rats each were exposed to room air or to 80, 200, 300, 400 or 500 ppm gNO for 6 continuous hours per day for up to 7 days. It is reported that all of the animals died on the first day of exposure to 400 and 500 ppm gNO with MetHb levels of 72.5 and 67 percents respectively. Six of the animals treated with 300 ppm gNO died during the first 1-2 days. All deaths were attributed to methemoglobinemia.

In additional studies, rats were exposed continuously to room air, 40, 80, 160, 200 and 250 ppm gNO for 6 hours/day for 28 days. No deaths occurred at gNO concentrations below 200 ppm.

At present, inhalation of gaseous nitric oxide (gNO) as a selective, short acting vasodilator is approved only at 80 ppm for use in full term infants with hypoxic respiratory failure associated with pulmonary hypertension. However, other studies have shown that at such low concentration of inhaled gNO, treatment of adults' respiratory diseases is limited, and the use of higher doses of gNO for treating various medical conditions by inhalation requires in-depth safety studies in humans.

Miller et. al. reported the effect of 1,600 ppm hours gNO against five planktonic (suspended in a liquid) species of methicillin resistant *S. aureus* (MRSA). An in vitro biofilm MRSA model was also used to compare gNO to the antibiotic vancomycin as an antibacterial agent. For the biofilm experiment, a drip flow reactor was used to grow a MRSA biofilm which was then exposed for eight hours to Ringers lactate, 200 ppm gNO (1,600 ppm hours), air or vancomycin (100-times MIC level). A reduction in the population of all five MRSA planktonic strains was observed after exposure to 1,600 ppm hours of gNO. In the biofilm experiment gNO was also shown to reduce MRSA.

Additional animal studies have shown that gNO at 160-200 ppm can exert potent antimicrobial effects against a broad range of microbes in vitro, ex vivo and in animal models [Kelly T. J. et al., *J. Clin. Invest.,* 1998, 102, 1200-7; McMullin B. et al., *Resp. Care.,* 2005, 50, 1451-6; Ghaffari A. et al., *Nitric Oxide,* 2005, 12, 129-40; Ghaffari A. et al., *Wound Repair Regen.,* 2007, 15, 368-77; Miller C. C. et al., *J. Cutan. Med. Surg.* 2004, 8, 233-8; Miller C. C. et al., *Nitric Oxide,* 2009, 20, 16-23], further suggesting its use as an antimicrobial agent in appropriate concentrations.

Studies conducted in a rat model of *Pseudomonas aeruginosa* pneumonia tested the antimicrobial effect of a gNO inhaled delivery regimen of intermittent 30 minute exposures of 160-200 ppm gNO, and revealed that 160 ppm gNO in that regiment is effective to reduce the pulmonary bioburden and leukocyte infiltration [Hergott C. A. et al., *Am. J. Resp. Crit. Care Med.,* 2006, 173, A135]. This treatment also shown to decrease the clinical symptoms of bovine respiratory disease in cattle [Schaefer A. L. et al., *Online J. Vet. Res.,* 2006, 10, 7-16].

Miller, C. C. et al. [*J. Cutan. Med. Surg.,* 2004, 8(4), 233-8] reported on topical treatment of a subject who had a chronic, non-healing wound and presence of a reoccurring biofilm with gNO at a treatment concentration of 200 ppm for two weeks. Within the first three days of treatment, the subject's biofilm was no longer visibly present and at one week, the wound size was reduced by 42%. The subject's ulcer continued to heal following the cessation of nitric oxide exposure.

WO 2005/110441 teaches a method and a corresponding device for combating microbes and infections by delivering intermittent high doses of 160-400 ppm gNO to a mammal for a period of time which cycles between high and low concentration of nitric oxide gas. The regimen involves delivery of 160 ppm gNO for 30 minutes every four hours with 0-20 ppm delivered for the 3.5 hours between the higher concentration deliveries. No experimental data are presented in this publication.

U.S. Pat. No. 7,122,018 teaches topical intermittent exposure to high concentration of nitric oxide ranging 160-400 ppm, for treatment of infected wounds and respiratory infections by a regimen of 4-hour sessions interrupted by 1 hour of rest while monitored methemoglobin blood levels.

U.S. Pat. No. 7,516,742 teaches intermittent high-low dosing by inhalation of gNO to overcome gNO-related toxicity, wherein the high concentration of gNO ranges from 80 to 300 ppm and the low concentration ranges from 0 to 80 ppm, while the regimen may be 160 ppm for 30 minutes every four hours with 20 ppm delivered for the 3.5 hours between the higher concentration deliveries while monitoring the concentration of $O_2$, NO and $NO_2$.

U.S. Pat. No. 7,520,866 teaches topical exposure of wounds to gNO at a high concentration ranging 160-400 ppm with a regime of two 4-hour sessions, interrupted by 1 hour of rest, wherein after a first treatment period with high concentration of gNO, a second treatment period at a lower concentration of 5-20 ppm may be provided to restore the balance of nitric oxide and induce collagen expression to aid in the closure of the wound.

U.S. Pat. No. 7,955,294 teaches a method and a corresponding device for topical and inhaled intermittent delivery high-low doses of gNO for a period of time which cycles between high and low concentration, with an exemplary cycle regimen of 160-200 ppm for 30 minutes followed by 0-80 ppm 3.5 hours wherein the cycling regimen can span 1-3 days.

Additional background art includes U.S. Pat. Nos. 8,083,997, 8,079,998, 8,066,904, 8,057,742, 7,531,133, 6,432,077, U.S. Patent Application Nos. 2011/0262335, 2011/0259325, 2011/0240019, 2011/0220103 and 2010/0331405, 2011/0112468, 2008/028786, 2007/0116785, 2007/0088316, 2007/0065473, 2007/0014688, 2006/0207594, 2005/0191372 and WO 2006/071957, WO 2006/110923, WO 2006/110923, WO 2007/057763, WO 2007/057763, WO 2000/30659 and EP 0692984; Miller C. C. et al., *Antimicrobial Agents And Chemotherapy,* 2007, 51(9), 3364-3366; and Miller C. C. et al., [*Resp Care,* 2008, 53(11), 1530].

SUMMARY OF THE INVENTION

The present inventors have studied the effect of intermittent inhalation of gaseous nitric oxide at a concentration of 160 ppm or more by human subjects and have shown that such intermittent inhalation protocol do not result in substantial changes in various physiological parameters of the human subject. Exemplary such parameters are those obtainable on-site in real-time, such as methemoglobin level, end-tidal $CO_2$ level, and oxygenation, and parameters which are obtainable off-site in the laboratory, such as blood nitrite level, urine nitrite level, and inflammatory markers' level. The present inventors have therefore demonstrated that such a method can be effected safely. Embodiments of the present invention therefore relate to methods of administering gaseous nitric oxide to human subjects in need thereof, while these parameters remain substantially unchanged. The disclosed administration can be used in methods of treating and/or preventing various medical conditions, which are manifested in the respiratory tract, or which can be treated via the respiratory tract, by subjecting a human subject to intermittent inhalation of gaseous nitric oxide at a concentration of 160 ppm or more.

According to an aspect of some embodiments of the present invention there is provided a method of treating a human subject suffering from a disease or disorder that is manifested in the respiratory tract or a disease or disorder that can be treated via the respiratory tract, the method comprising subjecting the subject to intermittent inhalation of gNO at a concentration of at least 160 ppm, thereby treating the disease or disorder.

According to some embodiments of the present invention, the disease or disorder is selected from the group consisting of a bacterial-, viral- and/or fungal bronchiolitis, a bacterial-, viral- and/or fungal pharyngitis and/or laryngotracheitis, a bacterial-, viral- and/or fungal pneumonia, a bacterial-, viral- and/or fungal sinusitis, a bacterial-, viral- and/or fungal upper and/or lower respiratory tract infection, a bacterial-, viral- and/or fungal-exacerbated asthma, a bacterial-, viral- and/or fungal conjunctivitis and uveitis, a respiratory syncytial viral infection, bronchiectasis, bronchitis, chronic obstructive lung disease (COPD), cystic fibrosis (CF), emphysema, otitis, otitis externa, otitis media, primary ciliary dyskinesia (PCD), aspergillosis, aspergilloma, pulmonary aspergillosis (ABPA) and cryptococcosis.

According to some embodiments of the present invention, the disease or disorder is an ophthalmological, otolaryngological and/or upper respiratory tract disease or disorder.

According to some embodiments of the present invention, the ophthalmological, otolaryngological and/or upper respiratory tract disease and disorder involves an infection or an inflammation of a bodily site selected from the group consisting of an ear cavity, a nasal cavity, an eye, a sinus cavity, an oral cavity, a pharynx, a epiglottis, a vocal cord, a trachea, an apex and an upper esophagus.

According to some embodiments of the present invention, the otolaryngological and/or upper respiratory tract disease and disorder is selected from the group consisting of a common cold, a stomatognathic disease, amigdalitis, an oral fugal infection, bacterial-, viral- and/or fungal sinusitis, bronchitis, candidiasis of the oral cavity (thrush), canker sores, epiglottitis (supraglottitis), halitosis, herpes, laryngitis, laryngotracheitis, nasopharyngitis, otitis, otitis externa, otitis media, conjunctivitis, uveitis, pharyngitis, rhinitis, rhinopharyingitis, rhinosinusitis, stomatitis, tonsillitis, tracheitis, tracheitis and tympanitis.

According to some embodiments of the present invention, the disease or disorder is a disease or disorder of the lower respiratory system of a human subject.

According to some embodiments of the present invention, the disease or disorder is selected from the group consisting of an obstructive condition, a restrictive condition, a vascular disease and an infection, an inflammation due to inhalation of foreign matter and an inhaled particle poisoning.

According to some embodiments of the present invention, the obstructive condition selected from the group consisting of a chronic obstructive lung disease (COPD), emphysema, bronchiolitis, bronchitis, asthma and viral, bacterial and fungal exacerbated asthma; the restrictive condition selected from the group consisting of fibrosis, cystic fibrosis, sarcoidosis, alveolar damage and pleural effusion; the vascular disease selected from the group consisting of pulmonary edema, pulmonary embolism and pulmonary hypertension; the infection selected from the group consisting of respiratory syncytial virus infection, tuberculosis, viral-, bacterial-, fungal-, and/or parasitic pneumonia, idiopathic pneumonia; and the inflammation due to inhalation of foreign matter and an inhaled particle poisoning selected from the group consisting of smoke inhalation, asbestosis and exposure to particulate pollutants and fumes.

According to some embodiments of the present invention, the disease or disorder is bronchiolitis.

According to some embodiments of the present invention, the bronchiolitis is associated with a virus.

According to some embodiments of the present invention, the virus is selected from the group consisting of a respiratory syncytial virus (RSV), a rhinovirus, a coronavirus, an enterovirus, an influenza A and/or B virus, a parainfluenza 1, 2 and/or 3 virus, a bocavirus, a human metapneumovirus, SARS and an adenovirus.

According to some embodiments of the present invention, the disease or disorder is asthma.

According to some embodiments of the present invention, the disease or disorder is cystic fibrosis.

According to some embodiments of the present invention, the disease or disorder is associated with an influenza virus.

According to some embodiments of the present invention, the disease or disorder is COPD.

According to some embodiments of the present invention, the disease or disorder selected from the group consisting of an acute respiratory disease or disorder, a chronic respiratory disease or disorder, an obstructive respiratory disease or disorder, an intrinsic or extrinsic restrictive respiratory disease or disorder, a pulmonary vascular disease or disorder, an infectious respiratory disease or disorder, an inflammatory respiratory disease or disorder, a pleural cavity disease or disorder, and a neonatal respiratory disease or disorder.

According to some embodiments of the present invention, the disease or disorder is associated with a pathogenic microorganism.

According to some embodiments of the present invention, the pathogenic microorganism is selected from the group consisting of a Gram-negative bacterium, a Gram-positive bacterium, a virus, a fungus and a parasite.

According to some embodiments of the present invention, the disease or disorder is selected from the group consisting of a bacterial-, viral- and/or fungal bronchiolitis, a bacterial-, viral- and/or fungal pharyngitis and/or laryngotracheitis, a bacterial-, viral- and/or fungal sinusitis, a bacterial-, viral- and/or fungal upper and/or lower respiratory tract infection, a bacterial-, viral- and/or fungal-exacerbated asthma, a bacterial-, viral-, fungal- and/or parasitic pneumonia, a common cold, a cystic fibrosis related infection, a respiratory syncytial viral infection, acidosis or sepsis, an oral fugal infection, aspergillosis, aspergilloma, cryptococcosis, pulmonary aspergillosis (ABPA), cryptococcosis bronchitis, candidiasis of the oral cavity (thrush), canker sores, epiglottitis (supraglottitis), halitosis, herpes, laryngitis, laryngotracheitis, nasopharyngitis, otitis and otitis media, pharyngitis, respiratory syncytial virus infection, a bacterial-, viral- and/or fungal conjunctivitis and uveitis, rhinitis, rhinopharyingitis, rhinosinusitis, stomatitis, tonsillitis, tracheitis, tuberculosis and tympanitis.

According to some embodiments of the present invention, the method further comprises, or is effected while, monitoring, during and following the subjecting, at least one on-site parameter selected from the group consisting of:
  a methemoglobin level (SpMet);
  an oxygen saturation level ($SpO_2$);
  an end tidal $CO_2$ level ($ETCO_2$); and
  a fraction of inspired oxygen level ($FiO_2$),
  and/or at least one off-site parameter selected from the group consisting of:
  a serum nitrite level ($NO_2$); and
  an inflammatory cytokine plasma level,
  in the subject, as these parameters are described herein.

According to some embodiments of the present invention, the method further comprises, or is effected while, monitoring, at least two of the parameters, as described herein.

According to some embodiments of the present invention, the method further comprises, or is effected while, monitoring all of the parameters.

According to some embodiments of the present invention, a change in the at least one of the parameters following the subjecting is less than 2 acceptable deviation units from a baseline, as described herein.

According to some embodiments of the present invention, a change in at least two of the parameters following the subjecting is less than 2 acceptable deviation units from a baseline.

According to some embodiments of the present invention, a change in all of the parameters following the subjecting is less than 2 acceptable deviation units from a baseline.

According to some embodiments of the present invention, a change in at least one of the on-site parameters following the subjecting is less than 2 acceptable deviation units from a baseline.

According to some embodiments of the present invention, a change in at least one of the off-site parameters following the subjecting is less than 2 acceptable deviation units from a baseline.

According to some of any of the embodiments of the present invention, the method further comprises, or is effected while, monitoring urine nitrite level in the subject, as described herein.

According to some embodiments of the present invention, the method further comprises, or is effected while, monitoring a change in the urine nitrite level following the subjecting is less than 2 acceptable deviation units from a baseline.

According to some of any of the embodiments of the present invention, the method further comprises, or is effected while, monitoring in the subject at least one off-site parameter selected from the group consisting of:
 a hematological marker;
 a vascular endothelial activation factor;
 a coagulation parameter;
 a serum creatinine level; and
 a liver function marker, as these parameters are described herein, in the subject.

According to some embodiments of the present invention, a change in at least one of the off-site parameters following the subjecting is less than 2 acceptable deviation units from a baseline.

According to some of any of the embodiments of the present invention, the method further comprises, or is effected while, monitoring at least one off-site parameter selected from the group consisting of:
 a hematological marker;
 a vascular endothelial activation factor;
 a coagulation parameter;
 a serum creatinine level; and
 a liver function marker, in the subject, as these parameters are described herein.

According to some embodiments of the present invention, a change in the at least one parameter following the subjecting is less than 2 acceptable deviation units from a baseline.

According to some of any of the embodiments of the present invention, the method further comprises, or is effected while, monitoring in the subject at least one on-site parameter selected from the group consisting of:
 a vital sign; and
 a pulmonary function, as these parameters are described herein.

According to some embodiments of the present invention, no deterioration is observed in the at least one parameter during and following the subjecting.

According to some of any of the embodiments of the present invention, the intermittent inhalation comprises at least one cycle of continuous inhalation of the gNO for a first time period, followed by inhalation of no gNO for a second time period.

According to some embodiments of the present invention, the first time period is about 30 minutes.

According to some embodiments of the present invention, the second time period ranges from 3 to 5 hours.

According to some embodiments of the present invention, the inhalation comprises from 1 to 6 of the cycles per day.

According to some embodiments of the present invention, the inhalation comprises 5 of the cycles per day.

According to some embodiments of the present invention, during the first time period, the concentration of gNO in the mixture deviates from the concentration of at least 160 ppm by less than 10%.

According to some embodiments of the present invention, during the first time period, a concentration of $NO_2$ in the mixture is less than 5 ppm.

According to some embodiments of the present invention, during the first time period, a concentration of $O_2$ in the mixture ranges from 20% to 25%.

According to some embodiments of the present invention, during the first time period, a fraction of inspired oxygen level ($FiO_2$) in the mixture ranges from 21% to 100%.

According to some embodiments of the present invention, the at least one parameter comprises $ETCO_2$ and during and following the subjecting, the $ETCO_2$ is less than 60 mmHg.

According to some embodiments of the present invention, the at least one parameter comprises SpMet and during and following the subjecting, the SpMet is increased by less than 5%.

According to some embodiments of the present invention, the at least one parameter comprises $SpO_2$ and during the subjecting, a level of the $SpO_2$ is higher than 89%.

According to some embodiments of the present invention, the at least one parameter comprises serum nitrite/nitrate level and during and following the subjecting, a level of the serum nitrite is less than 2.5/25 micromole per liter respectively.

According to some of any of the embodiments described herein, the intermittent inhalation of gNO is effected during a time period that ranges from 1 to 7 days.

According to some of any of the embodiments described herein, the subjecting is effected by an inhalation device selected from the group consisting of stationary inhalation device, a portable inhaler, a metered-dose inhaler, an atmospherically controlled enclosure and an intubated inhaler.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-B present background art bar graphs showing the gNO dosage curve as measured for *S. aureus* (FIG. 1A) and *P. aeruginosa* (FIG. 1B) grown on solid media, wherein relative percentage of growth of colony forming units (CFU) at 50, 80, 120 and 160 parts per million (ppm) of gaseous nitric oxide (gNO) compared with growth of CFU in medical air (100%);

FIGS. 2A-C present background art comparative plots showing the viral plaque formation in tissue as a function of time as measured for influenza A/victoria/H3N2 virions after exposure to nitric oxide 160 ppm and 800 ppm continuously for 4 hours (FIG. 2A), the same virions after being exposed to one gNO dose over 30 minute as compared to three 30 minute treatments Q4h (FIG. 2B), and the effect of continuous exposure to gNO at a concentration of 160 ppm for 3 hours of the highly pathogenic Avian Influenza H7N3 (as presented in US 2007/0116785);

FIGS. 4A-B present of the data obtained while monitoring methemoglobin (MetHb) levels before, during and after inhalation of 160 ppm of gaseous nitric oxide by 10 healthy human individuals, undergone 5 courses of gNO administration by inhalation daily, each lasting 30 minutes, for 5 consecutive days, while methemoglobin levels were measured using a pulse oximeter, wherein FIG. 4A is a plot of methemoglobin levels by percents as a function of time as measured before (time point 0), during 250 individual 30 minutes gNO administration courses (time interval of 0 to 30 minutes), after the courses (time interval of 30 to 60 minutes) and at 120 minutes, 180 minutes and 240 minutes after gNO administration was discontinued, and FIG. 4B is a plot of methemoglobin levels by percents as a function of time as measured at the beginning and end of 30 minutes gNO administration courses given over the course of 5 days, and followed 8, 12 and 26 days after gNO administration was discontinued;

FIGS. 5A-F present the data obtained while monitoring pulmonary function before, during and after inhalation of 160 ppm of gaseous nitric oxide by 10 healthy human individuals, wherein baseline values of pulmonary function tests were obtained within 7 days prior to gNO administration, and values during gNO administration were obtained on day 2 of the 5-days treatment and other data were obtained after the final gNO administration on day 5 and on days 8, 12 and 26, wherein FIG. 5A presents forced expiratory volume in 1 second (FEV1) in percents ($FEV_1$), FIG. 5B presents maximum mid-expiratory flow (MMEF), FIG. 5C presents carbon monoxide diffusing capacity (DLCO), FIG. 5D presents forced vital capacity (FVC), FIG. 5E presents total lung capacity (TLC) and FIG. 5F presents residual volume (RV), while all data are presented as means of all ten subjects and absolute differences compared to baseline prior to gNO administration, and statistical differences were assessed by Mann-Whitney test;

FIGS. 6A-F present blood levels of various cytokines before and after inhalation of 160 ppm gaseous nitric oxide by 10 healthy human individuals, as measured from blood samples collected within 7 days prior to gNO administration, each day during the treatment and 8, 12 and 26 days thereafter, wherein FIG. 6A presents the plasma levels of tumor necrosis factor (TNF)α, interleukin (IL)-1β data is presented in FIG. 6B, IL-6 in FIG. 6C, IL-8 in FIG. 6D, IL-10 in FIG. 6E and IL-12p70 in FIG. 6F, as determined by a cytometric bead array while statistical differences are compared by repeated measures ANOVA with Bonferroni post test for parametric data (IL-6, IL-8, IL-10, IL-12p70), or Friedman test with Dunn's post test for non-parametric data (TNF and IL-1b)

DESCRIPTION OF SPECIFIC EMBODIMENTS OF THE INVENTION

Figure 3A:
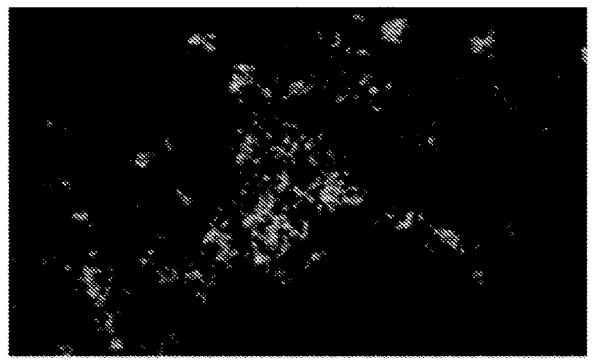
FIGS. 3A-D present images showing tissue culture samples harboring human rgRSV30 a common viral lung virus and the causative agent of Broncheolitis, coupled to a green fluorescent protein, and having a starting viral level of 2000 PFU (FIG. 3A), 1000 PFU (FIG. 3B) and 500 PFU (FIG. 3C), upon exposure to 160 ppm gNO for 30 minutes, and a comparative bar plot presenting the plaque reduction in the tested samples to control samples exposed to ambient air.
Figure 3B:
Figure 3C:
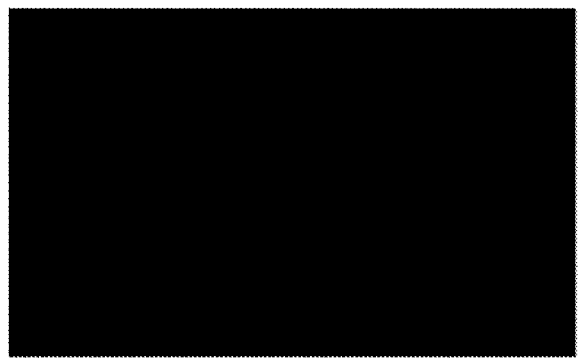
Figure 3D:
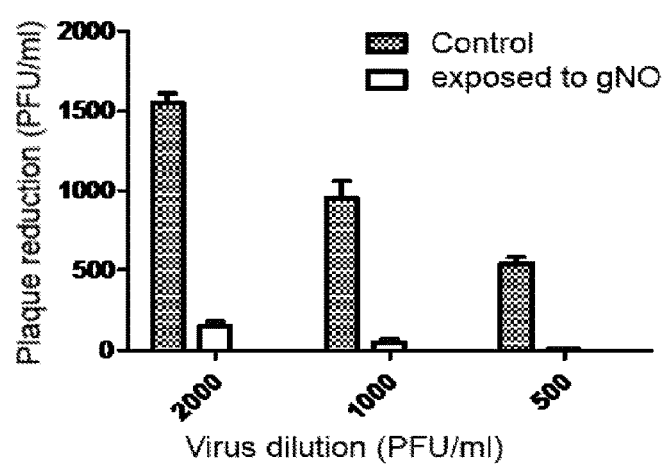

The present invention, in some embodiments thereof, relates to medical treatment of respiratory diseases in human subjects, and more particularly, but not exclusively, to medical procedures based on inhalation of gaseous nitric oxide and devices for effecting the same.

The principles and operation of the present invention may be better understood with reference to the figures and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

As discussed hereinabove, inhalation of gaseous nitric oxide (gNO) has been shown to be a highly effective broad-spectrum antimicrobial therapy; however, at effective antimicrobial concentration gNO may present serious adverse effects on humans. As shown in previous studies, the currently approved dose of 80 ppm gNO is presumably too low to exert sufficient antimicrobial effects.

As further discussed hereinabove, intermittent dosing and delivery by inhalation of gNO, cycling between high concentrations of gNO for a relatively short period of time and longer periods of no or low concentration of gNO has been suggested for overcoming the problems of NO toxicity. It has been suggested that the high concentration of gNO, delivered according to an intermittent regimen, would be effective in overwhelming the nitric oxide defense mechanisms of pathogens.

It has been further suggested in the art that the high concentration of gNO may be delivered at a concentration of between 80 ppm to 300 ppm, and that the time periods for delivering the high concentration should afford a daily delivery of 600 to 1000 ppm hours.

However, to date, a regimen of intermittent inhalation of gNO, cycling between high concentrations of gNO for a relatively short period of time and longer periods of no or low concentration of gNO has not been applied on humans. Studies demonstrating safety and efficacy of such protocols have never been conducted in human subjects and no protocols were provided for monitoring safety parameters and/or for treating human patients in need of gNO inhalation above the approved dose of 80 ppm.

In the course of devising and practicing novel methods of treating various bacterial, viral and protozoal infections, the present inventors have conducted studies in human subjects, and compiled suitable protocols for safe and effective treatment of a human subject by intermittent inhalation of high concentrations of gNO. The present inventors have demonstrated that short durations of high concentrations of gNO do not cause lung injury or other signs of adverse effects in humans and even improve some vital effects such as lung function and heart rate.

Specifically, the present inventors have conducted a prospective phase I open label safety study in healthy adults, who inhaled 160 ppm gNO for 30 minutes, five times a day, for five consecutive days. Neither significant adverse events nor adverse events attributable to gNO inhalation occurred and all individuals tolerated the gNO treatment courses well. Forced expiratory volume in 1 sec ($FEV_1$) percentage and other lung function parameters were improved and serum nitrites/nitrates, prothrombin, pro-inflammatory cytokine and chemokine levels, did not differ between baseline and day 5, while methemoglobin levels increased during the study period to a tolerated and accepted level of 0.9%. It was thus demonstrated that inhalation of 160 ppm gNO or more for 30 minutes, about 5 times daily, for 2-7 consecutive days, is safe and well tolerated in healthy individuals.

The present invention, in some embodiments thereof, therefore provides methods of treating human subjects by intermittent inhalation of high concentration of gNO. In some embodiments, the methods disclosed herein are effected while monitoring various parameters relevant for maintaining the desired dosage and regimen, relevant to the safety of the procedure and relevant for efficacy of the treatment.

According to an aspect of some embodiments of the present invention, there is provided a method of treating a human subject in need of inhalation of gaseous NO (gNO), which is effected by subjecting the human subject to intermittent inhalation of gNO at a concentration of at least 160 ppm.

In some embodiments, the method is effected while monitoring various physiological parameters in the subject, as described herein.

According to some embodiments of the invention, subjecting the human subject to gNO intermittent inhalation is effected by intermittently subjecting the human subject to a gaseous mixture which contains gNO at the indicated concentration (a gNO-containing gaseous mixture).

The human subject can be subjected to the inhalation by active or passive means.

By "active means" it is meant that the gaseous mixture is administered or delivered to the respiratory tract of the human subject. This can effected, for example, by means of an inhalation device having a delivery interface adapted for human respiratory organs. For example, the delivery interface can be placed intermittently on the human subject's respiratory organs, whereby when it is removed, the subject breaths ambient air or any other gaseous mixture that is devoid of gNO, as defined herein.

By "passive means" it is meant that the human subject inhales a gaseous mixture containing the indicated dose of gNO without devices for delivering the gaseous mixture to the respiratory tract.

For example, the subject can be subjected to 160 ppm or more gNO in an intermittent regimen by entering and exiting an atmospherically controlled enclosure filled with the gNO-containing mixture of gases discussed herein, or by filling and evacuating an atmospherically controlled enclosure which is in contact with a subject's respiratory tract.

The term "intermittent" is used herein and in the art as an antonym of "continuous", and means starting and ceasing an action and/or performing an action in intervals.

By "intermittent inhalation" it is meant that the subject is subjected to a gaseous mixture that contains the indicated concentration of gNO intermittently, and thus inhales such a gNO-containing gaseous mixture two or more times with intervals between each inhalation. The subject therefore inhales the gNO-containing gaseous mixture, then stops inhaling a gNO-containing gaseous mixture and inhales instead a gaseous mixture that does not contain the indicated concentration of gNO (e.g., air), then inhales again the gNO-containing gaseous mixture, and so on and so forth.

Hereinthroughout, "a gNO-containing gaseous mixture" is used, for simplicity, to describe a gaseous mixture that contains at least 160 ppm gNO. The gNO-containing mixture can comprise 160 ppm, 170 ppm, 180 ppm, 190 ppm, 200 ppm and even higher concentrations of gNO. Other gaseous mixtures mentioned herein include less than 160 ppm gNO or are being essentially devoid of gNO, as defined herein.

By "essentially devoid of gNO" it is meant no more than 50 ppm, no more than 40 ppm, no more than 30 ppm, no more than 20 ppm, no more than 10 ppm, no more than 5 ppm, no more than 1 ppm and no more than ppb, including absolutely no gNO.

In some embodiments, the method is carried out while maintaining a controlled mixture of inhaled and exhaled gases by standard means for monitoring and controlling, on-site, the contents and/or flow of the mixture to which the subject is subjected to, or that which is delivered through a delivery interface, and/or while monitoring on-site exhaled gases and controlling the intake by feedback in real-time. In some embodiments, the method is effected while monitoring the concentration of gNO, $FiO_2/O_2$, $ETCO_2$, and $NO_2$ in the gaseous mixture to which the subject is exposed or by monitoring other bodily systems non-invasively, such as blood oxygen saturation ($SpO_2/SaO_2/DO$) and the presence of methemoglobin in the blood (SpMet).

In some embodiments, the concentration of gNO in the gNO-containing gaseous mixture is controlled so as not to deviate from a predetermined concentration by more than 10%. For example, the method is carried out while the concentration of gNO, set to 160 ppm, does not exceed margins of 144 ppm to 176 ppm.

Similarly, the $NO_2$ content in a gNO-containing gaseous mixture is controlled such that the concentration of $NO_2$ is maintained lower than 5 ppm.

Further, oxygen level in the gNO-containing gaseous mixture is controlled such that the concentration of $O_2$ in the mixture ranges from about 20% to about 25%.

Alternatively or in addition, the oxygen level in the gNO-containing gaseous mixture is controlled such that the fraction of inspired oxygen ($FiO_2$) ranges from about 20% to about 100%.

The phrase "fraction of inspired oxygen" or "$FiO_2$", as used herein, refers to the fraction or percentage of oxygen in a given gas sample. For example, ambient air at sea level includes 20.9% oxygen, which is equivalent to $FiO_2$ of 0.21. Oxygen-enriched air has a higher $FiO_2$ than 0.21, up to 1.00, which means 100% oxygen. In the context of embodiments of the present invention, $FiO_2$ is kept under 1 (less than 100% oxygen)

The phrase "end tidal $CO_2$" or "$ETCO_2$", as used herein, refers to the partial pressure or maximal concentration of carbon dioxide ($CO_2$) at the end of an exhaled breath, which is expressed as a percentage of $CO_2$ or the pressure unit mmHg. Normal values for humans range from 5% to 6% $CO_2$, which is equivalent to 35-45 mmHg. Since $CO_2$ diffuses out of the lungs into the exhaled air, $ETCO_2$ values reflect cardiac output (CO) and pulmonary blood flow as the gas is transported by the venous system to the right side of the heart and then pumped to the lungs by the right ventricles. A device called capnometer measures the partial pressure or maximal concentration of $CO_2$ at the end of exhalation. In the context of embodiments of the present invention, a capnometer is used and $ETCO_2$ levels are monitored so as to afford a warning feedback when $ETCO_2$ is more than 60 mmHg.

Levels of respiratory NO, $NO_2$ and $O_2$ concentration levels (both inhaled and exhaled; inspiratory and expiratory gases) are typically monitored continuously by sampling from a mouthpiece sample port located in an inhalation mask NO, $NO_2$ and $O_2$ equipped with an electrochemical analyzer. In the context of embodiments of the present invention, safety considerations requires the absolute minimization of the number of occasions in which $NO_2$ levels exceed 5 ppm, gNO concentration variations exceeding 10%, and $FiO_2/O_2$ levels drop below 20% during gNO administration.

According to some embodiments of the present invention, the intermittent inhalation includes one or more cycles, each cycle comprising continuous inhalation of a gaseous mixture containing gNO at the specified high concentration (e.g., at least 160 ppm) for a first time period, followed by inhalation of a gaseous mixture containing no gNO for a second time period. According to some embodiments of the present invention, during the second period of time the subject may inhale ambient air or a controlled mixture of gases which is essentially devoid of gNO, as defined herein.

In some embodiments, the first time period spans from 10 to 45 minutes, or from 20 to 45 minutes, or from 20 to 40 minutes, and according to some embodiments, spans about 30 minutes.

According to some embodiments of the present invention, the second time period ranges from 3 to 5 hours, or from 3 to 4 hours, and according to some embodiments the second time period spans about 3.5 hours.

According to some embodiments of the present invention, this inhalation regimen is repeated 1-6 times over 24 hours, depending on the duration of the first and second time periods.

In some embodiments, a cycle of intermittent delivery of gNO, e.g., 160 ppm for 30 minutes followed by 3.5 hours of breathing no gNO, is repeated from 1 to 6 times a day. According to some embodiments, the cycles are repeated 5 times a day.

According to some embodiments of the present invention, the regimen of 1-5 cycles per day is carried out for 1 to 7 days, or from 2 to 7 days, or from 3 to 7 days. According to some embodiments of the present invention, the intermittent inhalation is effected during a time period of 5 days. However, longer time periods of intermittent gNO administration as described herein, are also contemplated.

In some embodiments, the method is effected while monitoring one or more physiological parameters in the subject and while assuring that no substantial change is effected in the monitored parameters (as demonstrated herein).

In some embodiments, monitoring the one or more physiological parameters is effected by noninvasive measures and/or mild invasive measures.

In some embodiments, monitoring the physiological parameter(s) in the subject is effected by on-site measurement and analysis techniques based on samples collected sporadically, continuously or periodically from the subject on-site in real-time at the subject's bed-side, and/or off-site measurement and analysis techniques based on samples collected sporadically or periodically from the subject which are sent for processing in a off-site which provides the results and analysis at a later point in time.

In the context of some embodiments of the present invention, the phrase "on-site measurement and analysis techniques" or "on-site techniques", refers to monitoring techniques that inform the practitioner of a given physiological parameter of the subject in real-time, without the need to send the sample or raw data to an off-site facility for analysis. On-site techniques are often noninvasive, however, some rely on sampling from an invasive medical device such as a respiratory tubus, a drainer tube, an intravenous catheter or a subcutaneous port or any other implantable probe. Thus, the phrase "on-site parameters", as used herein, refers to physiological parameters which are obtainable by online techniques.

Other that the trivial advantage of real-time on-site determination of physiological parameters, expressed mostly in the ability of a practitioner to respond immediately and manually to any critical change thereof, the data resulting from real-time online determination of physiological parameters can be fed into the machinery and be used for real-time feedback controlling of the machinery. In the context of embodiments of the present invention, the term "real-time" also relates to systems that update information and respond thereto substantially at the same rate they receive the information. Such real-time feedback can be used to adhere to the treatment regimen and/or act immediately and automatically in response to any critical deviations from acceptable parameters as a safety measure.

Hence, according to embodiments of the present invention, the term "on-site parameter" refers to physiological and/or mechanical and/or chemical datum which is obtainable and can be put to use or consideration at or near the subject's site (e.g., bed-side) in a relatively short period of time, namely that the time period spanning the steps of sampling, testing, processing and displaying/using the datum is relatively short. An "on-site parameter" can be obtainable, for example, in less than 30 minutes, less than 10 minutes, less than 5 minutes, less than 1 minute, less than 0.5 minutes, less than 20 seconds, less than 10 seconds, less than 5 seconds, or less than 1 second from sampling to use. For example, the time period required to obtain on-site parameters by a technique known as pulse oximetry is almost instantaneous; once the device is in place and set up, data concerning, e.g., oxygen saturation in the periphery of a subject, are available in less than 1 second from sampling to use.

In the context of some embodiments of the present invention, the phrase "off-site measurement and analysis techniques" or "off-site techniques", refers to techniques that provide information regarding a given physiological parameter of the subject after sending a sample or raw data to an offline, and typically off-site facility, and receiving the analysis offline, sometimes hours or days after the sample had been obtained. Off-site techniques are oftentimes based on samples collected by mild invasive techniques, such as blood extraction for monitoring inflammatory cytokine plasma level, and invasive techniques, such as biopsy, catheters or drainer tubus, however, some off-site techniques rely on noninvasive sampling such as urine and stool chemistry offline and off-site analyses. The phrase "off-site parameters", as used herein, refers to physiological parameters which are obtainable by off-site laboratory techniques.

Hence, according to embodiments of the present invention, the term "off-site parameter" refers to physiological and/or mechanical and/or chemical datum which is obtain and can be put to use or consideration in a relatively long period of time, namely that the time period spanning the steps of sampling, testing, processing and displaying/using the datum is long compared to on-site parameters. Thus, an "off-site parameter" is obtainable in more than 1 day, more than 12 hours, more than 1 hour, more than 30 minutes, more than 10 minutes, or more than 5 minutes from sampling to use.

An "off-site parameter" is typically obtainable upon subjecting a sample to chemical, biological, mechanical or other procedures, which are typically performed in a laboratory and hence are not performed "on-site", namely by or near the subject's site.

Noninvasive measures for monitoring various physiological parameters include, without limitation, pulse oximetry, nonintubated respiratory analysis and/or capnometry. Mild invasive measures for monitoring various physiological parameters include, without limitation, blood extraction, continuous blood gas and metabolite analysis, and in some embodiments intubated respiratory analysis and transcutaneous monitoring measures.

The term "pulse oximetry" refers to a noninvasive and on-site technology that measures respiration-related physiological parameters by following light absorption characteristics of hemoglobin through the skin (finger, ear lobe etc.), and on the spectroscopic differences observed in oxygenated and deoxygenated species of hemoglobin, as well as hemoglobin species bound to other molecules, such as carbon monoxide (CO), and methemoglobin wherein the iron in the heme group is in the $Fe^{3+}$ (ferric) state. Physiological parameters that can be determined by pulse oximetry include $SPO_2$, SpMet and SpCO.

The phrase "nonintubated respiratory analysis", as used herein, refers to a group of noninvasive and on-site technologies, such as spirometry and capnography, which provide measurements of the physiological pulmonary mechanics and respiratory gaseous chemistry by sampling the inhaled/exhaled airflow or by directing subject's breath to a detector, all without entering the subject's respiratory tract or other orifices nor penetrating the skin at any stage.

The term "spirometry" as used herein, refers to the battery of measurements of respiration-related parameters and pulmonary functions by means of a noninvasive and on-site spirometer. Following are exemplary spirometry parameters which may be used in the context of some embodiments of the present invention:

The spirometric parameter Tidal volume (TV) is the amount of air inhaled and exhaled normally at rest, wherein normal values are based on person's ideal body weight.

The spirometric parameter Total Lung Capacity (TLC) is the maximum volume of air present in the lungs.

The spirometric parameter Vital Capacity (VC) is the maximum amount of air that can expel from the lungs after maximal inhalation, and is equal to the sum of inspiratory reserve volume, tidal volume, and expiratory reserve volume.

The spirometric parameter Slow Vital Capacity (SVC) is the amount of air that is inhaled as deeply as possible and then exhaled completely, which measures how deeply a person can breathe.

The spirometric parameter Forced Vital Capacity (FVC) is the volume of air measured in liters, which can forcibly be blown out after full inspiration, and constitutes the most basic maneuver in spirometry tests.

The spirometric parameter Forced Expiratory Volume in the 1st second (FEV1) is the volume of air that can forcibly be blown out in one second, after full inspiration. Average values for FEV1 in healthy people depend mainly on sex and age, whereas values falling between 80% and 120% of the average value are considered normal. Predicted normal values for FEV1 can be calculated on-site and depend on age, sex, height, weight and ethnicity as well as the research study that they are based on.

The spirometric parameter FEV1/FVC ratio (FEV1%) is the ratio of FEV1 to FVC, which in healthy adults should be approximately 75-80%. The predicted FEV1% is defined as FEV1% of the patient divided by the average FEV1% in the appropriate population for that person.

The spirometric parameter Forced Expiratory Flow (FEF) is the flow (or speed) of air coming out of the lung during the middle portion of a forced expiration. It can be given at discrete times, generally defined by what fraction remains of the forced vital capacity (FVC), namely 25% of FVC (FEF25), 50% of FVC (FEF50) or 75% of FVC (FEF75). It can also be given as a mean of the flow during an interval, also generally delimited by when specific fractions remain of FVC, usually 25-75% (FEF25-75%). Measured values ranging from 50-60% up to 130% of the average are considered normal, while predicted normal values for FEF can be calculated on-site and depend on age, sex, height, weight and ethnicity as well as the research study that they are based on. Recent research suggests that FEF25-75% or FEF25-50% may be a more sensitive parameter than FEV1 in the detection of obstructive small airway disease. However, in the absence of concomitant changes in the standard markers, discrepancies in mid-range expiratory flow may not be specific enough to be useful, and current practice guidelines recommend continuing to use FEV1, VC, and FEV1/VC as indicators of obstructive disease.

The spirometric parameter Negative Inspiratory Force (NIF) is the greatest force that the chest muscles can exert to take in a breath, wherein values indicate the state of the breathing muscles.

The spirometric parameter MMEF or MEF refers to maximal (mid-)expiratory flow and is the peak of expiratory flow as taken from the flow-volume curve and measured in liters per second. MMEF is related to peak expiratory flow (PEF), which is generally measured by a peak flow meter and given in liters per minute.

The spirometric parameter Peak Expiratory Flow (PEF) refers to the maximal flow (or speed) achieved during the maximally forced expiration initiated at full inspiration, measured in liters per minute.

The spirometric parameter diffusing capacity of carbon monoxide ($D_LCO$) refers to the carbon monoxide uptake from a single inspiration in a standard time (usually 10 sec). On-site calculators are available to correct $D_LCO$ for hemoglobin levels, anemia, pulmonary hemorrhage and altitude and/or atmospheric pressure where the measurement was taken.

The spirometric parameter Maximum Voluntary Ventilation (MVV) is a measure of the maximum amount of air that can be inhaled and exhaled within one minute. Typically this parameter is determined over a 15 second time period before being extrapolated to a value for one minute expressed as liters/minute. Average values for males and females are 140-180 and 80-120 liters per minute respectively.

The spirometric parameter static lung compliance (Cst) refers to the change in lung volume for any given applied pressure. Static lung compliance is perhaps the most sensitive parameter for the detection of abnormal pulmonary mechanics. Cst is considered normal if it is 60% to 140% of the average value of a commensurable population.

The spirometric parameter Forced Expiratory Time (FET) measures the length of the expiration in seconds.

The spirometric parameter Slow Vital Capacity (SVC) is the maximum volume of air that can be exhaled slowly after slow maximum inhalation.

Static intrinsic positive end-expiratory pressure (static PEEPi) is measured as a plateau airway opening pressure during airway occlusion.

The spirometric parameter Maximum Inspiratory Pressure (MIP) is the value representing the highest level of negative pressure a person can generate on their own during an inhalation, which is expresented by centimeters of water pressure ($cmH_2O$) and measured with a manometer and serves as n indicator of diaphragm strength and an independent diagnostic parameter.

The term "capnography" refers to a technology for monitoring the concentration or partial pressure of carbon dioxide ($CO_2$) in the respiratory gases. End-tidal $CO_2$, or $ETCO_2$, is the parameter that can be determined by capnography.

Gas detection technology is integrated into many medical and other industrial devices and allows the quantitative determination of the chemical composition of a gaseous sample which flows or otherwise captured therein. In the context of embodiments of the present invention, such chemical determination of gases is part of the on-site, noninvasive battery of tests, controlled and monitored activity of the methods presented herein. Gas detectors, as well as gas mixers and regulators, are used to determine and control parameters such as fraction of inspired oxygen level ($FiO_2$) and the concentration of nitric oxide in the inhaled gas mixture.

According to some embodiments of the present invention, the measurement of vital signs, such as heart rate, blood pressure, respiratory rate and a body temperature, is regarded as part of a battery of on-site and noninvasive measurements.

The phrase "integrated pulmonary index", or IPI, refers to a patient's pulmonary index which uses information on inhaled/exhaled gases from capnography and on gases dissolved in the blood from pulse oximetry to provide a single value that describes the patient's respiratory status. IPI, which is obtained by on-site and noninvasive techniques, integrates four major physiological parameters provided by a patient monitor (end-tidal $CO_2$ and respiratory rate as measured by capnography, and pulse rate and blood oxygenation $SpO_2$ as measured by pulse oximetry), using this information along with an algorithm to produce the IPI score. IPI provides a simple indication in real time (on-site) of the patient's overall ventilatory status as an integer (score) ranging from 1 to 10. IPI score does not replace current patient respiratory parameters, but used to assess the patient's respiratory status quickly so as to determine the need for additional clinical assessment or intervention.

According to some of any of the embodiments described herein, the monitored physiological or chemical parameters include one or more of the following parameters:

a methemoglobin level (SpMet) (an on-line parameter);
an end-tidal $CO_2$ level ($ETCO_2$) (an on-line parameter);
an oxygenation level/FIO2 or oxygen saturation level ($SpO_2$) (an on-line parameter);
an inflammatory cytokine plasma level (an off-line parameter); and
a serum nitrite/nitrate level ($NO_2^-/NO_3^-$) (an off-line parameter).

According to some of any of the embodiments described herein, the monitored physiological or chemical parameters further include one or more of the following parameters:

a urine level of nitrogen dioxide (urine nitrite level) (an off-line parameter);
a vital sign selected from the group consisting of a heart rate, a blood pressure, a respiratory rate and a body temperature (an on-line parameter);
a pulmonary function (spirometric parameter) (an on-line parameter) such as, but not limited to, forced expiratory volume ($FEV_1$), maximum mid-expiratory flow (MMEF), diffusing capacity of the lung for carbon monoxide ($D_LCO$), forced vital capacity (FVC), total lung capacity (TLC) and residual volume (RV);
a hematological marker (an off-line parameter), such as, but not limited to, a hemoglobin level, a hematocrit ratio, a red blood cell count, a white blood cell count, a white blood cell differential and a platelet count;
a coagulation parameter (an off-line parameter) such as, but not limited to, a prothrombin time (PT), a prothrombin ratio (PR) and an international normalized ratio (INR);
a serum creatinine level (an off-line parameter);
a liver function marker (an off-line parameter) selected from the group consisting of a aspartate aminotransferase (AST) level, a serum glutamic oxaloacetic transaminase (SGOT) level, an alkaline phosphatase level, and a gamma-glutamyl transferase (GGT) level;
a vascular endothelial activation factor (an off-line parameter) selected from the group consisting of Ang-1, Ang-2 and Ang-2/Ang-1 ratio.

Non-limiting examples of inflammatory cytokines include (TNF)α, (IL)-1β, IL-6, IL-8, IL-10 and IL-12p70.

According to some embodiments of the present invention, the method as disclosed herein is such that no substantial change in at least one of the monitored parameters is observed.

In the context of the present embodiments, a change in a parameter is considered substantial when a value of an observation (measurement, test result, reading, calculated result and the likes) or a group of observations falls notably away from a normal level, for example falls about twice the upper limit of a normal level.

A "normal" level of a parameter is referred to herein as baseline values or simply "baseline". In the context of the present embodiments, the term "baseline" is defined as a range of values which have been determined statistically from a large number of observations and/or measurements which have been collected over years of medical practice with respect to the general human population, a specific sub-set thereof (cohort) or in some cases with respect to a specific person. A baseline is a parameter-specific value which is generally and medically accepted in the art as normal for a subject under certain physical conditions. These baseline or "normal" values, and means of determining these normal values, are known in the art. Alternatively, a baseline value may be determined from or in a specific subject before effecting the method described herein using well known and accepted methods, procedures and technical means. A baseline is therefore associated with a range of tolerated values, or tolerance, which have been determined in conjunction with the measurement of a parameter. In other words, a baseline is a range of acceptable values which limit the range of observations which are considered as "normal". The width of the baseline, or the difference between the upper and lower limits thereof are referred to as the "baseline range", the difference from the center of the range is referred to herein as the "acceptable deviation unit" or ADU. For example, a baseline of 4-to-8 has a baseline range of 4 and an acceptable deviation unit of 2.

In the context of the present embodiments, a significant change in an observation pertaining to a given parameter is one that falls more than 2 acceptable deviation unit (2 ADU) from a predetermined acceptable baseline. For example, an observation of 10, pertaining to a baseline of 4-to-8 (characterized by a baseline range of 4, and an acceptable deviation unit of 2), falls one acceptable deviation unit, or 1 AUD from baseline. Alternatively, a change is regarded substantial when it is more than 1.5 ADU, more than 1 ADU or more than 0.5 ADU.

In the context of the present embodiments, a "statistically significant observation" or a "statistically significant deviation from a baseline" is such that it is unlikely to have occurred as a result of a random factor, error or chance.

It is noted that in some parameters or groups of parameters, the significance of a change thereof may be context-dependent, biological system-dependent, medical case-dependent, human subject-dependent, and even measuring machinery-dependent, namely a particular parameter may require or dictate stricter or looser criteria to determine if a reading thereof should be regarded as significant. It is noted herein that in specific cases some parameters may not be measurable due to patient condition, age or other reasons. In such cases the method is effected while monitoring the other parameters.

A deviation from a baseline is therefore defined as a statistically significant change in the value of the parameter as measured during and/or following a full term or a part term of administration the regimen described herein, compared to the corresponding baseline of the parameter. It is noted herein that observations of some parameters may fluctuate for several reasons, and a determination of a significant change therein should take such events into consideration and correct the appropriate baseline accordingly.

Monitoring methemoglobin and serum nitrite levels has been accepted in the art as a required for monitoring the safety of gNO inhalation in a subject. Yet, to date, no clear indication that methemoglobin and serum nitrite levels remain substantially unchanged upon gNO inhalation by a human subject.

According to some embodiments of the present invention, the method comprises monitoring at least one of the parameters described hereinabove.

According to some embodiments, the monitored parameter is methemoglobin level.

As methemoglobin levels can be measured using noninvasive measures, the parameter of percent saturation at the periphery of methemoglobin (SpMet) is used to monitor the stability, safety and effectiveness of the method presented herein. Hence, according to some embodiments of the present invention, the followed parameter is SpMet and during and following the administration, the SpMet level does not exceed 5%, and preferably does not exceed 1%. As demonstrated in the Examples section that follows, a SpMet level of subjects undergoing the method described herein does not exceed 1%.

According to some embodiments, the monitored parameter is serum nitrate/nitrite level.

High nitrite and nitrate levels in a subject's serum are associated with NO toxicity and therefore serum nitrite/nitrate levels are used to detect adverse effects of the method presented herein. According to some embodiments of the present invention, the tested parameter is serum nitrite/nitrate, which is monitored during and following the treatment and the acceptable level of serum nitrite is less than 2.5 micromole/liter and serum nitrate is less than 25 micromole/liter.

According to some embodiments, the monitored parameter is level of inflammatory markers.

An elevation of inflammatory markers is associated with a phenomenon called "cytokine storm", which has been observed in subjects undergoing gNO inhalation treatment. Monitoring inflammatory markers while performing the method as described herein has never been taught heretofore. Moreover, methods involving gNO inhalation at a regimen in which no significant change in inflammatory markers is observed have never been taught heretofore.

According to some embodiments, the method comprises monitoring at least two of the above-mentions parameters.

In some of these embodiments, the monitored parameters are two or all of methemoglobin level, serum nitrite level and inflammatory markers.

While changes in methemoglobin level, serum nitrite level and inflammatory markers are typically observed in subjects subjected to gNO inhalation, the findings that no substantial change in these parameters has been observed in human subjects undergoing the disclosed regimen are surprising.

Hence, according to some embodiments of the present invention, the method as disclosed herein is carried out while monitoring the methemoglobin level (SpMet), the serum nitrite level ($NO_2^-$) and a group of inflammatory cytokine plasma level, such as, but not limited to, (TNF)α, (IL)-1β, IL-6, IL-8, IL-10 and IL-12p70 serum levels in the subject, wherein a change in at least one of these parameters is less than 2 acceptable deviation units from a baseline.

According to some of any of the embodiments described herein, the method is effected while monitoring at least one, at least two, or all on-site parameters which include SpMet, $SpO_2$ and $ETCO_2$, and/or monitoring at least one or all off-site parameters which include serum nitrite/nitrate level and inflammatory cytokines in the plasma.

For example, the method is effected while monitoring SpMet as an on-site parameter. Alternatively, the method is effected while monitoring SpMet and $ETCO_2$ as on-site parameters. Alternatively, the method is effected while monitoring SpMet, $ETCO_2$ and $SpO_2$ as on-site parameters.

Further alternatively, the method is effected while monitoring SpMet as one on-site parameter, and inflammatory cytokines in the plasma as one off-site parameter. Alternatively, the method is effected while monitoring SpMet and $ETCO_2$ as on-site parameters, and serum nitrite/nitrate level as one off-site parameter. Alternatively, the method is effected while monitoring SpMet as one on-site parameter, and inflammatory cytokines in the plasma and serum nitrite/nitrate level as off-site parameters. Alternatively, the method is effected while monitoring $ETCO_2$ as one on-site parameter, and inflammatory cytokines in the plasma and serum nitrite/nitrate level as off-site parameters. Alternatively, the method is effected while monitoring $SpO_2$ as one on-site parameter, and inflammatory cytokines in the plasma and serum nitrite/nitrate level as off-site parameters.

Further alternatively, the method is effected while monitoring SpMet, $ETCO_2$ and $SpO_2$ as on-site parameters, and inflammatory cytokines in the plasma and serum nitrite/nitrate level as off-site parameters.

According to some of any of the embodiments described herein, the method is effected while monitoring at least one, at least two, or all on-site parameters which include SpMet, $SpO_2$ and $ETCO_2$, and/or monitoring at least one or all off-site parameters which include serum nitrite/nitrate level and inflammatory cytokines in the plasma, and further monitoring one or more and in any combination of:
  a urine $NO_2$ level (an off-line parameter);
  a vital sign (an on-line parameter);
  a pulmonary function (an on-line parameter);
  a hematological marker (an off-line parameter);
  a coagulation parameter (an off-line parameter);
  a serum creatinine level (an off-line parameter);
  a liver function marker (an off-line parameter);
  a vascular endothelial activation factor (an off-line parameter).

According to some of any of the embodiments described herein, the method is effected while monitoring at least one, at least two, or all on-site chemical parameters in the inhaled gas mixture, such as $FiO_2$ and $NO_2$.

It is noted herein that for any of the abovementioned embodiments, that the method is effected while no substantial change is observed in any one or more than one or all of the monitored parameters described herein.

According to some embodiments of the present invention, the method is effected while monitoring urine nitrite levels, such that the urine nitrite level is substantially unchanged during and subsequent to carrying out the method as presented herein. It is noted herein that urine nitrite levels may fluctuate for several known reasons, and a determination of a significant change therein should take such events into consideration and correct the appropriate baseline accordingly.

It is noted that urine nitrite level is indicative for the safety of gNO inhalation, yet, has never been monitored heretofore in the context of gNO inhalation in general and in the context of intermittent gNO inhalation as disclosed herein.

According to some embodiments of the present invention, hematological markers, such as the hemoglobin level, the hematocrit ratio, the red blood cell count, the white blood cell count, the white blood cell differential and the platelet count, are substantially unchanged during and subsequent to carrying out the method as presented herein.

According to some embodiments of the present invention, vascular endothelial activation factors, such as Ang-1, Ang-2 and Ang-2/Ang-1 ratio, as well as the serum creatinine level and various liver function markers, such as the aspartate aminotransferase (AST) level, the serum glutamic oxaloacetic transaminase (SGOT) level, the alkaline phosphatase level, and the gamma-glutamyl transferase (GGT) level, are substantially unchanged during and subsequent to carrying out the method as presented herein.

Oxygenation of the subject can be assessed by measuring the subject's saturation of peripheral oxygen ($SpO_2$). This parameter is an estimation of the oxygen saturation level, and it is typically measured using noninvasive measures, such as a pulse oximeter device. Hence, according to some embodiments of the present invention, the followed parameter during and following the administration is $SpO_2$, and the level of $SpO_2$ is higher than about 89%.

According to some embodiments of the present invention, various vital signs, such as the heart rate, the blood pressure, the respiratory rate and the body temperature; and/or various pulmonary functions (spirometric parameter), such as forced expiratory volume (FEV1), maximum mid-expiratory flow (MMEF), diffusing capacity of the lung for carbon monoxide ($D_LCO$), forced vital capacity (FVC), total lung capacity (TLC) and residual volume (RV); and various coagulation parameters, such as the prothrombin time (PT), the prothrombin ratio (PR) and the international normalized ratio (INR), are substantially unchanged during and subsequent to carrying out the method as presented herein. It is noted that these parameters are regarded as an indication that the general health of the subject is not deteriorating as a result of the medical condition and/or the treatment.

According to some embodiments, the aforementioned general health indicators show an improvement during and subsequent to carrying out the method as presented herein, indicating that the treatment is beneficial to the subject.

Thus, according to some embodiments of the present invention, the method as disclosed herein is effected such that general health indicators as described herein are at least remained unchanged or are improved.

According to some embodiments of the present invention, a human subject in need of gNO inhalation treatment is a human that suffers from a disease or disorder of the respiratory tract.

As used herein, the phrase "respiratory tract" encompasses all organs and tissues that are involved in the process of respiration in a human subject or other mammal subject, including cavities connected to the respiratory tract such as ears and eyes.

A respiratory tract, as used herein, encompasses the upper respiratory tract, including the nose and nasal passages, prenasal sinuses, pharynx, larynx, trachea, bronchi, and nonalveolar bronchioles; and the lower respiratory tract, including the lungs and the respiratory bronchioles, alveolar ducts, alveolar sacs, and alveoli therein.

Respiratory diseases and disorders which are treatable by any of the methods presented herein, can be classified as: Inflammatory lung disease; Obstructive lung diseases such as COPD; Restrictive lung diseases; Respiratory tract infections, such as upper/lower respiratory tract infections, and malignant/benign tumors; Pleural cavity diseases; pulmonary vascular diseases; and Neonatal diseases.

According to embodiments of the present invention, restrictive diseases include intrinsic restrictive diseases, such as asbestosis caused by long-term exposure to asbestos dust; radiation fibrosis, usually from the radiation given for cancer treatment; certain drugs such as amiodarone, bleomycin and methotrexate; as a consequence of another disease such as rheumatoid arthritis; hypersensitivity pneumonitis due to an allergic reaction to inhaled particles; acute respiratory distress syndrome (ARDS), a severe lung condition occurring in response to a critical illness or injury; infant respiratory distress syndrome due to a deficiency of surfactant in the lungs of a baby born prematurely; idiopathic pulmonary fibrosis; idiopathic interstitial pneumonia, of which there are several types; sarcoidosis; eosinophilic pneumonia; lymphangioleiomyomatosis; pulmonary Langerhans' cell histiocytosis; pulmonary alveolar proteinosis; interstitial lung diseases (ILD) such as inhaled inorganic substances: silicosis, asbestosis, berylliosis, inhaled organic substances: hypersensitivity pneumonitis, drug induced: antibiotics, chemotherapeutic drugs, antiarrhythmic agents, statins, connective tissue disease: Systemic sclerosis, polymyositis, dermatomyositis, systemic lupus erythematosus, rheumatoid arthritis, infection, atypical pneumonia, pneumocystis pneumonia (PCP), tuberculosis, Chlamydia trachomatis, RSV, idiopathic sarcoidosis, idiopathic pulmonary fibrosis, Hamman-Rich syndrome, antisynthetase syndrome, and malignant lymphangitic carcinomatosis; and extrinsic restrictive diseases, such as neuromuscular diseases, including Myasthenia gravis and Guillain barre; nonmuscular diseases of the upper thorax such as kyphosis and chest wall deformities; diseases restricting lower thoracic/abdominal volume due to obesity, diaphragmatic hernia, or the presence of ascites; and pleural thickening.

According to embodiments of the present invention, obstructive diseases include asthma, COPD, chronic bronchitis, emphysema, bronchiectasis, CF, and bronchiolitis.

Respiratory diseases and disorders which are treatable by any of the methods presented herein, can also be classified as acute or chronic; caused by an external factor or an endogenous factor; or as infectious or noninfectious respiratory diseases and disorders.

Diseases and disorders of the respiratory tract include otolaryngological and/or an upper respiratory tract and/or a lower respiratory system diseases and disorders, and are also referred to herein as "respiratory diseases" or "respiratory diseases and disorders".

Exemplary, and most common, diseases and disorders of the respiratory tract include acute infections, such as, for example, sinusitis, broncholitis, tuberculosis, pneumonia, bronchitis, and influenza, and chronic conditions such as asthma, CF and chronic obstructive pulmonary disease.

According to some embodiments of the present invention, subject in need of gNO inhalation treatment is a human subject that suffers from a disease or disorder that is manifested in the respiratory tract, as defined herein.

In any of the embodiments described herein a human subject includes any living human at any age, from neonatals and newborns, to adults and elderly people, at any weight, height, and any other physical state.

A disease or disorder that is manifested in the respiratory tract encompasses also any disease or disorder that is not caused by an infection or airway obstruction in the respiratory tract, rather, is caused by another factor yet can be manifested by an infection or airway obstruction in the respiratory tract.

An exemplary such condition is cystic fibrosis (CF). CF is a genetic disorder in which mutations in the epithelial chloride channel, CF transmembrane conductance regulator (CFTR), impairs various mechanism of innate immunity. Chronic microbial lung infections are the leading cause of morbidity and mortality in CF patients. Early antibiotic eradication treatment of CF patients for the most prevalent bacterial pathogen, *Pseudomonas aeruginosa*, has considerably increased the life expectancy in CF, however still the vast majority of adult CF patients suffer from chronic *P. aeruginosa* lung infections which are difficult to treat due to biofilm formation and the development of antibiotic resistant strains of the virulent. Other species found in CF airways include antibiotic resistant strains such as methicillin-resistant *S. aureus* (MRSA), members of the *Burkholderia cepacia* complex, *Haemophilus influenzae, Stenotrophomonas maltophilia, Achromobacter xylosoxidans*, non-tuberculous mycobacteria (NTM) species and various strict anaerobic bacteria.

According to some embodiments of the present invention, a human subject in need of gNO inhalation treatment is a human subject that is prone to suffer from a respiratory tract disease or disorder. By "prone to suffer" it is meant that the human subject is at a higher risk of suffering from the disease or disorder compared to a normal subject.

Such human subjects include, for example, immuno-compromised subjects such as subjects having HIV, cancer patients undergoing or which underwent chemotherapy, cancer and other patients undergoing or which underwent transplantation, including bone marrow transplantation and transplantation of a solid organ, subjects with chronic asthma or sinusitis, and subjects which were in contact with subject(s) afflicted by an infectious respiratory tract disease or disorder, or which have otherwise been exposed to a pathogen. It is noted herein that subjecting a human subject prone to suffer from a respiratory tract disease or disorder to the gNO inhalation treatment presented herein, can be regarded as a preventative treatment, preventive care, or as a prophylactic medical treatment.

Alternatively, a human subject in need of gNO treatment is an immuno-compromised subject such as subjects having HIV, cancer patients undergoing or which underwent chemotherapy, cancer and other patients undergoing or which underwent transplantation, including bone marrow transplantation and transplantation of a solid organ, which have been infected or otherwise suffer from a respiratory disease or disorder as described herein.

Exemplary diseases or disorders of such immune-compromised subjects are described in more detail hereinbelow.

According to some embodiments of the present invention, a human subject in need of gNO inhalation treatment is a human subject that suffers from a disease or disorder that is treatable via the respiratory tract.

Since inhaled gNO is absorbed in the lungs, it contacts the blood system and hence can reach other tissues and organs in the biological system. Thus, diseases and disorders that are not associated directly to the respiratory tract, yet can be treated by inhalation of agents that show therapeutic effect on such diseases and disorders, can be treated according to embodiments of the present invention. Exemplary such diseases and disorders include, but are not limited to, acidosis, sepsis, leishmaniasis, and various viral infections.

The parasite family, *Leishmania*, has been extensively studied in the literature which shows that gNO kills the parasite directly. *Leishmania* parasites preferentially infect macrophages. Infection by *Leishmania* causes the macrophage to produce IFN-gamma which induces the production of iNOS, an enzyme responsible for the production of nitric oxide. However, certain presentations of *Leishmania* cause the macrophage to also produce IL-10 and TGF-Beta which both minimize the induction of iNOS. The decrease in NO levels is a key factor allowing the infection to continue. It would therefore be highly beneficial to determine if treatment with gNO inhalation circumvents the defense system of the parasite. Nonetheless, gNO administered by inhalation at any concentration has not been demonstrated as safe or effective against leishmaniasis hitherto.

Additional such diseases and disorders include viral infections. Viruses have been and most likely will stay a challenging "moving target" for modern medicinal methodologies. Without cell walls and thiol based detoxification pathways, viruses may be inherently more susceptible to nitrosative stress. Several in-vitro studies, using NO donors, as oppose to gNO, have demonstrated that NO inhibits viral ribonucleotide reductase, a necessary constituent enzyme of viral DNA synthesis and therefore inhibit viral replication. It has been demonstrated that NO inhibits the replication of viruses early during the replication cycle, involving the synthesis of vRNA and mRNA encoding viral proteins. Other direct mechanisms could also account for the viricidal effects through viral DNA deamination. Nonetheless, gNO administered by inhalation has not been demonstrated as safe or effective against acute viral infections or as a prophylactic viral treatment hitherto.

The present inventors have demonstrated that the use of supraphysiologic concentrations of gNO administered by inhalation may provide a broad spectrum, non-specific antiviral activity to be used at various stages of infection. The present inventors have tested two strains of human influenza (influenza A/victoria H3N2) and one strain of highly pathogenic avian influenza (H7N2), as well as human respiratory syncytial virus (rgRSV30), using the traditional plaque or fluorescence assays, and demonstrated that treating RSV and influenza with 160 ppm exogenous gaseous NO reduced their infectivity.

According to some embodiments of the present invention, a human in need of gNO inhalation is a human afflicted by a disease or disorder that is treatable by gNO. The range of treatable diseases and disorders spans ophthalmological, otolaryngological and/or an upper respiratory tract and/or a lower respiratory system diseases and disorders, as well as systemic medical conditions.

Exemplary diseases and disorders treatable by gNO include, without limitation, a heparin-protamine reaction, a traumatic injury, a traumatic injury to the respiratory tract, acidosis or sepsis, acute mountain sickness, acute pulmonary edema, acute pulmonary hypertension, acute pulmonary thromboembolism, adult respiratory distress syndrome, an acute pulmonary vasoconstriction, aspiration or inhalation injury or poisoning, asthma or status asthmaticus, bronchopulmonary dysplasia, hypoxia or chronic hypoxia, chronic pulmonary hypertension, chronic pulmonary thromboembolism, cystic fibrosis (CF), Aspergilosis, aspergilloma, Cryptococcosis, fat embolism of the lung, haline membrane disease, idiopathic or primary pulmonary hypertension, inflammation of the lung, perinatal aspiration syndrome, persistent pulmonary hypertension of a newborn and post cardiac surgery.

According to some embodiments of the present invention, exemplary treatable diseases or disorders include, without limitation, a bacterial-, viral- and/or fungal bronchiolitis, a bacterial-, viral- and/or fungal pharyngitis and/or laryngotracheitis, a bacterial-, viral- and/or fungal pneumonia, a bacterial-, viral- and/or fungal pulmonary infection, a bacterial-, viral- and/or fungal sinusitis, a bacterial-, viral- and/or fungal upper and/or lower respiratory tract infection, a bacterial-, viral- and/or fungal-exacerbated asthma, a respiratory syncytial viral infection, bronchiectasis, bronchitis, chronic obstructive lung disease (COPD), cystic fibrosis (CF), Aspergilosis, aspergilloma, Cryptococcosis, emphysema, otitis, a bacterial-, viral- and/or fungal otitis externa, otitis media, conjunctivitis, uveitis primary ciliary dyskinesia (PCD) and pulmonary aspergillosis (ABPA).

According to some embodiments of the present invention, the disease or disorder treatable by gNO is associated with a pathogenic microorganism. The pathogenic microorganisms, according to some embodiments of the present invention, can be, for example, Gram-negative bacteria, Gram-positive bacteria, viruses and viable virions, fungi and parasites.

Exemplary pathogenic microorganisms include, but are not limited to, *Acinetobacter baumarmii, Aspergillus niger, Bacteroides vulgatus, Burkoholderia cepacia, Candida albicans, Clostridium perfringens*, Enteric Group 137, *Enterococcus faecium, Enterobacter aerogenes, Escherichia cofi, Klebsiella pneumoniae, Mycobacteria tuberculosis, Pasteurella multocida, Propionibacterium acnes, Propionibacterium granulosum, Proteus mirabilis, Providencia rusfigianii, Pseudomonas aeruginosa, Pseudomonas* sp., *Serratia marcesecens, Staphylococcus aureus, Staphylococcus aureus* (FVL positive), *Staphylococcus aureus* (VNL positive), *Staphylococcus aureus* MRSA, *Staphylococcus aureus* MRSA. *Staphylococcus aureus* MRSA, Streptococci Group B, Streptococci Group D, Streptococci Group G, *Streptococcipyrogenes rosenbach* Group A, *Streptococcus pneumoniae, Trichophyton meriagrophytes, Trichophyton rubrum*, and *Vibrio vuMucus*.

Exemplary Gram-negative bacteria include, but are not limited to, Proteobacteria, Enterobacteriaceae, *Acinetobacter baumannii., Bdellovibrio, Cyanobacteria, Enterobacter cloacae, Escherichia coli, Helicobacter, Helicobacter pylori, Hemophilus influenza, Klebsiella pneumonia, Legionella, Legionella pneumophila, Moraxella, Moraxella catarrhalis, Neisseria gonorrhoeae, Neisseria meningitides, Proteus mirabilis, Pseudomonas, Pseudomonas aeruginosa, Salmonella, Salmonella enteritidis, Salmonella typhi, Serratia marcescens, Shigella, Spirochaetes* and *Stenotrophomonas*.

Exemplary Gram-positive bacteria include, but are not limited to, *Bacillus* species such as *B. alcalophilus, B. alvei, B. aminovorans, B. amyloliquefaciens, B. aneurinolyticus, B. anthracis, B. aquaemaris, B. atrophaeus, B. boroniphilus, B. brevis, B. caldolyticus, B. centrosporus, B. cereus, B. circulans, B. coagulans, B. firmus, B. flavothermus, B. fusiformis, B. globigii, B. infernus, B. larvae, B. laterosporus, B. lentus, B. licheniformis, B. megaterium, B. mesentericus, B. mucilaginosus, B. mycoides, B. natto, B. pantothenticus, B. polymyxa, B. pseudoanthracis, B. pumilus, B. schlegelii, B. sphaericus, B. sporothermodurans, B. stearothermophilus, B. subtilis, B. thermoglucosidasius, B. thuringiensis, B. vulgatis* and *B. weihenstephanensis, Clostridium* species such as *C. acetobutylicum, C. aerotolerans, C. argentinense, C. baratii, C. beijerinckii, C. bifermentans, C. botulinum, C. butyricum, C. cadaveris, C. cellulolyticum, C. chauvoei, C. clostridioforme, C. colicanis, C. difficile, C. estertheticum, C. fallax, C. feseri, C. formicaceticum, C. histolyticum, C. innocuum, C. kluyveri, C. lavalense, C. ljungdahlii, C. novyi, C. oedematiens, C. paraputrificum, C. perfringens, C. phytofermentans, C. piliforme, C. ragsdalei, C. ramosum, C. scatologenes, C. septicum, C. sordellii, C. sporogenes, C. sticklandii, C. tertium, C. tetani, C. thermocellum, C. thermosaccharolyticum, C. tyrobutyricum, Corynebacterium* species such as *C. accolens, C. afermentans, C. amycolatum, C. aquaticum, C. argentoratense, C. auris, C. bovis, C. diphtheriae, C. equi, C. flavescens, C. glucuronolyticum, C. glutamicum, C. granulosum, C. haemolyticum, C. halofytica, C. jeikeium, C. macginleyi, C. matruchotii, C. minutissimum, C. parvum, C. propinquum, C. pseudodiphtheriticum, C. pseudotuberculosis, C. pyogenes, C. renale, C. spec, C. striatum, C. tenuis, C. ulcerans, C. urealyticum, C. urealyticum* and *C. xerosis, Listeriai* species such as *L. grayi, L. innocua, L. ivanovii, L. monocytogenes, L. murrayi, L. seeligeri* and *L. welshimeri, Staphylococcus* species such as *S. arlettae, S. aureus, S. auricularis, S. capitis, S. caprae, S. carnosus, S. chromogenes, S. cohnii, S. condimenti, S. delphini, S. devriesei, S. epidermidis, S. equorum, S. felis, S. fleurettii, S. gallinarum, S. haemolyticus, S. hominis, S. hyicus, S. intermedius, S. kloosii, S. leei, S. lentus, S. lugdunensis, S. lutrae, S. massiliensis, S. microti, S. muscae, S. nepalensis, S. pasteuri, S. pettenkoferi, S. piscifermentans, S. pseudintermedius, S. pseudolugdunensis, S. pulvereri, S. rostri, S. saccharolyticus, S. saprophyticus, S. schleiferi, S. sciuri, S. simiae, S. simulans, S. stepanovicii, S. succinus, S. vitulinus,*

*S. warneri* and *S. xylosus*, and *Streptococcus* species such as *S. agalactiae, S. anginosus, S. bovis, S. canis, S. constellatus, S. dysgalactiae, S. equinus, S. iniae, S. intermedius, S. mitis, S. mutans, S. oralis, S. parasanguinis, S. peroris, S. pneumoniae, S. pyogenes, S. ratti, S. salivarius, S. sanguinis, S. sobrinus, S. suis, S. thermophilus, S. uberis, S. vestibularis, S. viridians* and *S. zooepidemicus*.

As discussed hereinabove, and demonstrated in the Examples section that follows below, the disease or disorder which can be treated by effecting the method presented herein to a human subject, includes bacterial-, viral- and/or fungal bronchiolitis, bacterial-, viral- and/or fungal pharyngitis and/or laryngotracheitis, bacterial-, viral- and/or fungal sinusitis, bacterial-, viral- and/or fungal upper and/or lower respiratory tract infection, bacterial-, viral- and/or fungal-exacerbated asthma, bacterial-, viral-, fungal- and/or parasitic pneumonia, the common cold, cystic fibrosis related infections, aspergillosis, aspergilloma, respiratory syncytial viral infections, acidosis or sepsis, oral fugal infections, bronchitis, candidiasis of the oral cavity (thrush), canker sores, epiglottitis (supraglottitis), halitosis, herpes, laryngitis, laryngotracheitis, nasopharyngitis, otitis externa and otitis media, conjunctivitis, uveitis (and other eye infections) pharyngitis, pulmonary aspergillosis (ABPA), respiratory syncytial virus infections, rhinitis, rhinopharyingitis, rhinosinusitis, stomatitis, tonsillitis, tracheitis, tuberculosis, cryptococcosis and tympanitis.

According to some embodiments of the present invention, a human subject in need of gNO inhalation is a human subject in need of preemptive, preventative and prophylactic treatment of a disease or disorder as described herein. Hence, a subject not suffering from any current or manifested disease, and/or a subject that is suspected of being exposed to a pathogen, and/or a subject that suffers from one disease, is treated by the method(s) presented herein in order to prevent the occurrence of another disease or disorder.

As presented in the Examples section that follows below, the present inventors have contemplated treating bronchiolitis as this condition is defined hereinbelow. Hence, according to an aspect of some embodiments of the present invention, there is provided a method of treating a human subject suffering from bronchiolitis, which is effected by subjecting the subject to intermittent inhalation regimen, gNO at a concentration of at least 160 ppm, thereby treating bronchiolitis.

It is noted herein that the treatable bronchiolitis, according to some embodiments of the present invention, can be associated with a pathogenic microorganism or not associated therewith. It is therefore noted that the method presented herein can be used to treat idiopathic bronchiolitis, bacterial- and/or viral-induced bronchiolitis and/or bronchiolitis that is associated with other medical conditions such as, but not limited to, immune deficiency.

In some embodiments, the bronchiolitis is a viral-induced bronchiolitis. Exemplary viral infections that are known to be manifested by bronchiolitis include, but not limited to, respiratory syncytial viruses (RSV), rhinoviruses, coronaviruses, enteroviruses, influenza A and/or B viruses, parainfluenza 1, 2 and/or 3 viruses, bocaviruses, human metapneumoviruses, SARS and adenoviruses. However, infections caused by any other viruses are also contemplated.

The findings that high concentration of inhaled gNO, which was shown to exhibit a therapeutic effect against a variety of conditions associated with pathogenic microorganisms, can be safely used in human subjects indicate that the disclosed intermittent inhalation of gNO can be efficiently utilized for treating such conditions, as well as any other conditions that are treatable by gNO when contacting the respiratory tract.

Hence, according to an aspect of some embodiments of the present invention, there is provided a method of treating a human subject suffering from a disease or a disorder which is associated, directly or indirectly, with a pathogenic microorganism, as described herein. The method is effected by subjecting the subject to intermittent inhalation regimen of gNO at a concentration of at least 160 ppm, as described in any of the present embodiments.

According to another aspect of some embodiments of the present invention, there is provided a method of treating a human subject suffering from a disease or disorder that is manifested in the respiratory tract or a disease or disorder that can be treated via the respiratory tract, which is effected by subjecting the subject to intermittent inhalation regimen, gNO at a concentration of at least 160 ppm, as described in any of the present embodiments.

According to another aspect of some embodiments of the present invention, there is provided a method of treating a human subject prone to suffer from a disease or disorder that is manifested in the respiratory tract or a disease or disorder that can be treated via the respiratory tract, as described herein, which is effected by subjecting the subject to intermittent inhalation regimen, gNO at a concentration of at least 160 ppm, as described in any of the present embodiments. Such a method can be regarded as a preventive or prophylaxis treatment of the subject.

According to another aspect of some embodiments of the present invention, there is provided a method of treating a human subject suffering from an ophthalmological, otolaryngological and/or upper respiratory tract disease or disorder, as described herein, which is effected by subjecting the subject to intermittent inhalation regimen, gNO at a concentration of at least 160 ppm, as described in any of the present embodiments.

According to some embodiments of the present invention, the otolaryngological and/or upper respiratory tract disease and disorder involves an infection or an inflammation of a bodily site selected from the group consisting of an ear cavity, a nasal cavity, a sinus cavity, an oral cavity, a pharynx, a epiglottis, a vocal cord, a trachea, an apex and an upper esophagus.

According to some embodiments of the present invention, the ophthalmological, otolaryngological and/or upper respiratory tract diseases and disorders include, without limitation, the common cold, a stomatognathic disease, amigdalitis, an oral fugal infection, bacterial-, viral- and/or fungal sinusitis, bronchitis, candidiasis of the oral cavity (thrush), canker sores, epiglottitis (supraglottitis), halitosis, herpes, laryngitis, laryngotracheitis, nasopharyngitis, otitis (externa and media), conjunctivitis, uveitis and other eye infections, pharyngitis, rhinitis, rhinopharyingitis, rhinosinusitis, stomatitis, tonsillitis, tracheitis, tracheitis and tympanitis.

According to another aspect of some embodiments of the present invention, there is provided a method of treating a human subject suffering from a disease or disorder of the lower respiratory system, as described herein, by intermittent inhalation regimen, gNO at a concentration of at least 160 ppm, as described in any of the embodiments herein.

According to some embodiments of the present invention, diseases and disorders of the lower respiratory system include, without limitation, an obstructive condition, a restrictive condition, a vascular disease and an infection, an inflammation due to inhalation of foreign matter and an inhaled particle poisoning.

According to some embodiments of the present invention, the obstructive condition includes, without limitation, a chronic obstructive lung disease (COPD), emphysema, bronchiolitis, bronchitis, asthma and viral, bacterial and fungal exacerbated asthma; the restrictive condition includes, without limitation, fibrosis, cystic fibrosis, sarcoidosis, alveolar damage and pleural effusion; the vascular disease includes, without limitation, pulmonary edema, pulmonary embolism and pulmonary hypertension; the infection includes, without limitation, respiratory syncytial virus infection, tuberculosis, a viral-, bacterial-, fungal-, and/or parasitic pneumonia, idiopathic pneumonia; and the inflammation due to inhalation of foreign matter and an inhaled particle poisoning includes, without limitation, smoke inhalation, asbestosis and exposure to particulate pollutants and fumes.

According to some embodiments of the present invention, any of the methods of treating or preventing a subject as described herein encompasses all of the conditions, disease and disorders described hereinabove for subjects in need of gNO inhalation.

It is noted herein that any of the methods described herein can be used beneficially to treat bronchiolitis, which occurs in infants and children. Administration by inhalation is considered to be a preferred method of for young patients and more so when invasive techniques are avoided.

Influenza of all sorts and types is also treatable by the methods presented herein, and where some embodiments being based on a relatively simple and noninvasive technique, these methods are particularly preferred in complicated and severe cases of influenza.

The methods presented herein are effective in treating asthma in children and adults, as well as treating COPD and CF.

The methods presented herein are fast and effective in treating a resent medical condition, disease or disorder. Moreover, the methods presented herein are effective in preventing the disease or disorder from taking hold in a subject which is prone to suffer from, contract or develop a disease or disorder which is associated with the respiratory tract. According to some embodiments, some methods of gNO inhalation are particularly useful in preventing a disease or disorder, while other methods are particularly effective in treating an existing disease or disorder.

According to some embodiments of the present invention, any of the methods described herein can be used in the context of the following conditions:

Any of the methods presented herein can be used effectively to treat respiratory diseases or disorders that occur in humans which are diagnosed with medical conditions that adversely affect their innate immune system. Humans which are diagnosed with such medical conditions are said to be immuno-compromised or immuno-suppressed. It is noted herein that immuno-suppression may be a direct result of a pathogen, such as an HIV infection, or an indirect result such as immuno-suppression that occurs in cancer patients being treated with chemotherapeutic agents. Hence, according to some embodiments of the present invention, the methods presented herein are used to treat a present respiratory disease or disorder in immuno-compromised human subject.

Immuno-compromised or immuno-suppressed human subjects are intrinsically more susceptible to opportunistic infections, rendering them prone to suffer from respiratory diseases or disorders. Other incidents and conditions that render a human more susceptible to infections are associated with location, occupation, age, living and environmental conditions, close contact with large groups of people and livestock, close contact with sick people and the likes, all of which are encompassed in the context of the present invention as rendering a human subject prone to suffer from a respiratory disease or disorder.

According to some embodiments of the present invention, any of the methods presented herein are used to treat opportunistic infections in a human subject.

Exemplary opportunistic infections, which occur in human suffering from HIV, and can be treated or prevented by the methods presented herein include, without limitation *pneumocystis jiroveci* infection, *Pneumocystis carinii* infection and *pneumocystis pneumonia* (a form of pneumonia caused by the yeast-like fungus).

Exemplary medical conditions which are associated with immunosuppression include AIDS, cancer, primary ciliary dyskinesia (PCD, also known as immotile ciliary syndrome or Kartagener Syndrome).

According to some embodiments of the present invention, any of the methods presented herein is used to treat a human subject suffering from AIDS.

According to some embodiments of the present invention, any of the methods presented herein are used to treat a human subject suffering from cancer.

According to some embodiments of the present invention, any of the methods presented herein can be used to treat or prevent an infection associated with immune deficiency. These include prevention/pre-emptive treatment and treatment of infections in oncology patients.

According to some embodiments of the present invention, in any of the methods presented herein the human subject is at risk of suffering from a nosocomial infection.

Exemplary groups of human subject which are prone to suffer respiratory disease or disorder due to general, environmental and occupational conditions include, without limitation, elderly people, medical staff and personnel (doctors, nurses, caretakers and the likes) of medical facilities and other care-giving homes and long-term facilities, commercial airline crew and personnel (pilots, flight attendants and the likes), livestock farmers and the likes.

According to some embodiments, the methods presented herein are used to treat or prevent nosocomial infections, such s infections stemming from direct-contact transmission, indirect-contact transmission, droplet transmission, airborne transmission, common vehicle transmission and vector borne transmission. Exemplary nosocomial infections are caused by antibiotic resistant bacteria such as carbapenem-resistant *Klebsiella* (KPC) or other Enterobacteriaceae, MRSA methicillin resistance Staph. *Aureus*, Group A *Streptococcus, Staphylococcus aureus* (methicillin sensitive or resistance), *Neisseria meningitides* of any serotype and the likes.

Hence, according to embodiments of the present invention, the methods presented herein can be used to prevent carriage, transmission and infection of pathogenic bacteria and antibiotic resistant pathogenic microorganisms.

According to some embodiments of the present invention, any of the methods of treatment presented herein further includes monitoring, during and following administration gNO, one or more of the parameters as described in any of the embodiments hereinabove.

In some embodiments, the methods are effected while monitoring one, two, etc., or all of:

a methemoglobin level (SpMet) (an on-line parameter);
an end-tidal $CO_2$ level ($ETCO_2$) (an on-line parameter);
an oxygenation level or oxygen saturation level ($SpO_2$) (an on-line parameter);

an inflammatory cytokine plasma level (an off-line parameter); and a serum nitrite/nitrate level ($NO_2^-/NO_3^-$) (an off-line parameter).

In some embodiments, no significant deviation from baseline, as described herein, is shown in at least one, two, three, four or all of the above parameters, when monitored, as described herein.

Other parameters and markers may be monitored as well, as presented hereinabove, while showing significant deviation from a baseline, and various general health indicators show no change to the worse, or an improvement, as presented hereinabove.

According to some embodiments of the present invention, in any of the methods of treatment presented herein, the gNO administration can be effected by an inhalation device which includes, without limitation, a stationary inhalation device, a portable inhaler, a metered-dose inhaler and an intubated inhaler.

An inhaler, according to some embodiments of the present invention, can generate spirometry data and adjust the treatment accordingly over time as provided, for example, in U.S. Pat. No. 5,724,986 and WO 2005/046426. The inhaler can modulate the subject's inhalation waveform to target specific lung sites. According to some embodiments of the present invention, a portable inhaler can deliver both rescue and maintenance doses of gNO at subject's selection or automatically according to a specified regimen.

According to some embodiments of the present invention, an exemplary inhalation device may include a delivery interface adaptable for inhalation by a human subject.

According to some embodiments of the present invention, the delivery interface includes a mask or a mouthpiece for delivery of the mixture of gases containing gNO to a respiratory organ of the subject.

According to some embodiments of the present invention, the inhalation device further includes a gNO analyzer positioned in proximity to the delivery interface for measuring the concentration of gNO, oxygen and nitrogen dioxide flowing to the delivery interface, wherein the analyzer is in communication with the controller.

According to some embodiments of the present invention, subjecting the subject to the method described herein is carried out by use of an inhalation device which can be any device which can deliver the mixture of gases containing gNO to a respiratory organ of the subject. An inhalation device, according to some embodiments of the present invention, includes, without limitation, a stationary inhalation device comprising tanks, gauges, tubing, a mask, controllers, values and the likes; a portable inhaler (inclusive of the aforementioned components), a metered-dose inhaler, a an atmospherically controlled enclosure, a respiration machine/system and an intubated inhalation/respiration machine/system. An atmospherically controlled enclosure includes, without limitation, a head enclosure (bubble), a full body enclosure or a room, wherein the atmosphere filling the enclosure can be controlled by flow, by a continuous or intermittent content exchange or any other form of controlling the gaseous mixture content thereof.

It is expected that during the life of a patent maturing from this application many relevant medical procedures involving inhalation of gNO will be developed and the scope of the term treatment by inhalation of gNO is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

As used herein, the term "treating" includes abrogating, substantially inhibiting, slowing or reversing the progression of a condition, substantially ameliorating clinical or aesthetical symptoms of a condition, and substantially preventing the appearance of clinical or aesthetical symptoms of a condition, namely preemptive, preventative and prophylactic treatment.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental or calculated support in the following examples.

EXAMPLES

Reference is now made to the following examples, which together with the above descriptions illustrate some embodiments of the invention in a non limiting fashion.

Example 1 (Background Art)

Determination of Effective Antimicrobial Level of gNO

The direct effect of gNO on bacteria was studied by determining the concentration of gNO which is lethal for microbes. Once an optimal dose was estimated, timing study was conducted to optimize the duration of exposure of the microbes to gNO.

For these initial studies, highly dense inoculums of *P. aeruginosa* and *S. aureus* suspensions ($10^8$ chum) were plated onto agar plates. These plates were then exposed to various concentrations of gNO in an exposure device in order to evaluate the effect on colony growth.

FIGS. 1A-B present bar-plot showing the gNO dosage curve on as measured for *S. aureus* (FIG. 1A) and *P. aeruginosa* (FIG. 1B) grown on solid media, wherein relative percentage of growth of colony forming units (CFU) at 50, 80, 120 and 160 parts per million (ppm) of gaseous nitric oxide (gNO) compared with growth of CFU in medical air (100%).

As can be seen in FIGS. 1A-B, the results confirmed that gNO has an inhibitory effect on *P. aeruginosa* and *S. aureus* growth. The data provided preliminary evidence that there was a time and dose relationship trend, with the amount of bactericidal (antibiotic) activity increasing with increased time of exposure and concentration of gNO. As the concentration of gNO increased, the number of colonies growing on the plates decreased. Although there was a downward bactericidal trend towards 5-10% survival, none of the data showed a 100% bactericidal effect. Some bacteria may have survived because the materials and chemicals in the agar may have reacted with the gNO and buffered the effect.

It is noted that bacterial colonies remained the same in size and number after being transferred to a conventional incubator for 24 hours, whereas controls increased in number and size to the degree that they could not be counted. This observation suggested that gNO exposure prevented the growth of the bacteria, and may have killed the bacteria at some point during the gNO exposure.

These results demonstrated that gNO had a bacteristatic effect on both bacterial strains, and as a result, subsequent studies were designed to further study the bactericidal effects of gNO. The studies demonstrated that levels of gNO greater than 120 ppm reduced the colony formation by greater than 90%. Studies then followed indicating that the time required to achieve this effect occurred between 8-12 hours.

A similar procedure was used to determine the time required to induce an effective bactericidal effect with 200 parts per million gNO, a concentration just above the dose used in the dose-ranging study presented hereinabove, on a representative collection of drug resistant gram-positive and gram-negative strains of bacteria associated with clinical infection.

A successful bactericidal effect was defined as a decrease in bacteria greater than 3 $\log_{10}$ CFU/mL. Further, *C. albicans*, Methicillin Resistant *S. aureus* (MRSA), a particularly resistant strain of *P. aeruginosa* from a cystic fibrosis patient, Group B *Streptococcus*, and *M. smegmatis* were also included to evaluate if yeasts, a multi-drug resistant strain of bacteria and actinomycetes have a similar response. These bacteria represent a comprehensive variety of drug resistant bacterial pathogens that contribute to both respiratory and wound infections. The results from these studies laid the foundation for use of gNO at a concentration higher than 160 ppm as an antibacterial agent, specifically for use against bacteria associated with clinical infections.

For this study, saline was selected as a suspension media because it would not mask the direct effect of gNO as a bactericidal, whereas fully supplemented growth medium might introduce external variables (e.g., buffer or react with gNO). Other media might also provide metabolites and replenish nutrients that produce enzymes that protect bacteria from oxidative and nitrosative damage, thereby masking the effect of gNO. Furthermore, it has been suggested that a saline environment better represents the hostile host environment that bacteria typically are exposed to in vivo. In saline, the colonies were static but remained viable. These conditions are similar to the approach previously used in animal models.

Table 1 present the results of this study of the effect of 200 ppm gNO on a variety of microbes.

TABLE 1

| Bacteria | Gram Staining | Latent Period (hours) | -2.5 $\log_{10}$ (hours) | $LD_{100}$ (hours) |
|---|---|---|---|---|
| *S. aureus* (ATCC) | Positive | 3 | 3.3 | 4 |
| *P. aeruginosa* (ATCC) | Negative | 1 | 2.1 | 3 |
| MRSA | Positive | 3 | 4.2 | 5 |
| *Serracia* sp. | Negative | 4 | 4.9 | 6 |
| *S. aureus* (Clinical) | Positive | 3 | 3.7 | 4 |
| *Klebsiella* sp.#1 | Negative | 3 | 3.5 | 6 |
| *Klebsiella* sp.#2 | Negative | 2 | 4.1 | 5 |
| *Klebsiella* sp.#3 | Negative | 3 | 5.1 | 6 |
| *S. maltophilia* | Negative | 2 | 2.8 | 4 |
| *Enterobacter* sp. | Negative | 4 | 5.3 | 6 |
| *Acinetobacter* sp. | Negative | 4 | 5 | 6 |
| *E. Coli* | Negative | 3 | 4.2 | 5 |
| Group B *Streptococci* | Positive | 1 | 1.5 | 2 |
| *Mycobacterium* | Positive | 7 | 9.2 | 10 |
| Average | | 2.77 | 3.82 | 4.77 |
| SD | | 1.01 | 1.17 | 1.3 |

As can be seen in Table 1, this study showed that gNO at 200 ppm had a complete bactericidal effect on all microorganisms tested. Without exception, every bacteria challenged with 200 ppm gNO had at least a 3 $\log_{10}$ reduction in CFU/mL. Furthermore, every test resulted in a complete and total cell death of all bacteria. These results were characterized by a period of latency when it appeared that the bacteria were unaffected by gNO exposure. The latent period was then followed by an abrupt death of all cells; gram negative and gram positive bacteria, antibiotic resistant bacterial strains, yeast and mycobacteria all were susceptible to 200 ppm gNO. It is noted that the two drug resistant bacteria strains were also susceptible to treatment with gNO at 200 ppm.

These results indicate to a significant difference in the lag period for mycobacteria compared to all other organisms.

The lag period suggests that mycobacteria may have a mechanism that protects the cell from the cytotoxicity of gNO for a longer period than other bacteria.

Example 2

Determination of Effective Antiviral Level of gNO

The efficacy of treating human influenza A with gNO has been studied. Two strains (H3N2 and H7N3) of the virus were studied and showed that treating influenza virions or incubated cells with 160 ppm exogenous gNO reduced not only viral replication but also their infectivity in a Madin-Darby Canine Kidney (MDCK) cell model of infection. gNO has been demonstrated as an effective anti-viral agent in both human Influenza A and highly pathogenic avian influenza.

The viruses used for the following experiments were from freezer stocks containing $1\times10^6$-$1\times10^7$ pfu's/ml.

A standard plaque assay was used for the study. Frozen stock solutions of virions were diluted 1:10 in PBS and 3 ml were placed in each well of six well trays. The samples were either exposed to 160 ppm gNO or medical air at 37° C. Following exposure 0.5 ml was inoculated onto confluent MDCK cells, grown in six well trays, and incubated at 37° C. for 1 hour. The inoculums were then removed and 1:1 mixture of 2×DMEM and agar, with 2% trypsin, was added to each well and then incubated at 37° C. After 2 days the trays were fixed with 3.7% formaldehyde and the agar was removed from each well. The wells were then stained with crystal violet revealing the plaques.

A standard plaque assay was used for a hemagglutination assay. Frozen stocks of virions were diluted 1:10 in PBS and 3 ml were placed in each well of six well trays. The samples were either exposed to 160-20,000 ppm gNO or medical air at 37° C. For measure the effect of gNO on pH, when a large concentration of NO is added to saline the pH falls, therefore, a standard acid/base buffers were used to match the pH in the control to that of the treated. Following exposure the samples were diluted 1:2 in round bottom 96 well trays. Guinea pig red blood cells were added and agglutination was measured according to standard procedures.

FIGS. 2A-C present plot of viral growth as a function of time measured for influenza A/victoria/H3N2 virions after exposure to nitric oxide 160 ppm and 800 ppm continuously for 4 hours (FIG. 2A), the same virions after being exposed to one gNO dose over 30 minute as compared to three 30 minute treatments Q4h (FIG. 2B), and the effect of continuous exposure to gNO at a concentration of 160 ppm for 3 hours of the highly pathogenic Avian Influenza H7N3.

As can be seen in FIGS. 2A-C, gNO has been shown as capable of reducing the infectivity of 2 strains of human influenza A/Victoria/H3N2 and HPAI/H7N2 viruses, and that the anti-viral effect of exposure to 160 ppm gNO is more evident in the intermittent form of exposure.

The efficacy of treating viral infection by respiratory syncytial virus by the methods presented herein was tested by exposure for 30 minutes of human respiratory syncytial virus (rgRSV30) to a gas mixture containing 160 ppm nitric oxide, using standard plaque assay as described hereinabove.

FIGS. 3A-D present the data obtained in the experiment using tissue culture samples harboring human rgRSV30, coupled to a green fluorescent protein, wherein the control experiment the samples were exposed to a ambient air (data not shown), and the tested samples having a starting viral level of 2000 PFU (FIG. 3A), 1000 PFU (FIG. 3B) and 500 PFU (FIG. 3C), were exposed to 160 ppm gNO for 30 minutes, whereas FIG. 3D presents a comparative bar plot comparing the control to test results.

As can be seen in FIGS. 3A-D, when the starting plaque-forming unit (PFU) of RSV was 2000 and 1000 PFU, a single exposure of 30 minutes to 160 ppm gNO reduced the virus viability by a factor of bout 10, and at a starting level of 500 PFU, viral viability was substantially nullified.

Example 3

Administration of gNO to Healthy Human Subjects

Cohort: 10 healthy adult volunteer subjects (5 males, 5 females), aged 20 to 62 years, were enrolled in the study after screening their medical history, a physical examination, pulmonary function tests and blood values. Exclusion criteria included individuals less than 19 years of age, pregnant females and unwilling to practice birth control during the study, diagnosed with pulmonary disease, epistaxis, hemoptysis, methemoglobinemia, organ transplant recipient or receiving antibiotic therapy.

Regimen and post-treatment: After obtaining informed consent, treatment was initiated within 5 days of enrollment. Subjects were housed in a hospital ward and received 160 ppm gNO for 30 minutes every four hours (Q4h), five times a day, for five consecutive days by inhalation. Subjects returned for follow-up evaluations 3, 7 and 21 days after the final gNO administration. Subject safety was determined by monitoring vital signs, methemoglobin levels, lung function, blood chemistry, hematology, prothrombin time, inflammatory cytokine/chemokines levels and endothelial activation. These parameters were compared to baseline and at various time-points during and after gNO administration.

Device: Subjects were administered gNO through a modified disposable mouthpiece to maximize mixing. Inspiration was spontaneously initiated by the subject from a conventional intermittent positive pressure breathing respirator (Mark-7, Carefusion, USA) in fixed flow mode delivering 48 liters per minute (LPM). Flows of gas were verified with a calibrated mass flow meter (TSI, USA). Gaseous nitric oxide (gNO, obtained at INOmax, Ikaria, USA) at a concentration of 800 ppm delivered at a flow of 12 LPM was titrated into a distal delivery port on the mouth piece connected to the respirator during inspiratory phase only (pressure switch). The Mark 7 respirator was supplied by an air/oxygen blender (Bird Sentry, Carefusion, USA) set to deliver 26% oxygen.

All components of the gNO delivery system were approved by the Therapeutic Product Directorate of Health Canada.

Monitoring of Chemicals and Physiological Parameters During Administration:

The levels of gNO, $NO_2$, $O_2$ and methemoglobin were monitored during the administration of gNO. The target gas mixture was 160 ppm gNO with a nitrogen dioxide ($NO_2$) level of less than 5 ppm and an oxygen ($O_2$) level ranging from 21% to 25%. Inspiratory NO, $NO_2$ and $O_2$ levels were continuously monitored by sampling from the mouthpiece sample port located about 6 millimeters from the mouth of the subject with an AeroNOx (Pulmonox, AB, Canada) NO, $NO_2$ and $O_2$ electrochemical analyzer. Delivery safety was determined by the number of occasions that $NO_2$ exceeded 5 ppm, gNO exceeding 10% variation and $O_2$ dropping below 20% during gNO administration. A commercially available noninvasive pulse oximeter (Rad 57, Masimo Corporation, USA) was used to measure saturation levels at the periphery of methemoglobin (SpMet).

These parameters were measured continuously during every gNO administration course and for 3.5 hours after the first treatment of the day. Daily serum samples were collected and frozen at −80° C. and the serum nitrite/nitrite level was measured using the Griess reagent.

Subjects underwent full pulmonary function tests (PFT), including lung diffusing capacity (DLCO) by a trained technician utilizing a calibrated pulmonary function system (Jaeger MasterScreen, VIASYS Healthcare, USA) on screening and days 2, 8, 12 and 26. Spirometry test (Microloop by Micro Medical, England) was performed on days 1, 3 and 4. Effect of gNO on lung function and DLCO was determined by changes from baseline, treatment days and follow up days.

General medical examinations were performed by a pulmonary physician on screening and on days 8, 12 and 26 to obtain oxygenation and vital sign measurements. Abbreviated physical examination by a registered nurse was carried out each day prior to initiation of treatments on days 1-5. Oxygenation was measured with a pulse oximeter (Rad 57, Masimo Corporation, USA) which was used according to manufacturer's guidelines to measure functional oxygen saturation of arterial hemoglobin ($SPO_2$) and heart rate. These parameters were measured continuously during every gNO administration and for 3.5 hours after the first treatment of the day. Cardiovascular status was determined by monitoring heart rate, blood pressure, respiratory rate and temperature. Values were recorded prior to the start of each gNO administration, following a 5 minute rest. During treatments, vital signs (except temperature) were also performed 15 minutes after the start of the treatment and at the end of gNO administration and recorded. After the first treatment each day, vital signs were recorded at every 30 minutes until the start of the second gNO administration of the day.

Hematological assessment included a complete blood count and differentials (hemoglobin, hematocrit, red blood cell count, white blood cell count, white blood cell differential, and platelet count) were obtained in order to monitor blood chemistry, hematology and inflammation measurements. The blood chemistry profile included serum creatinine, and liver function tests such as aspartate aminotransferase (AST) serum glutamic oxaloacetic transaminase (SGOT), alkaline phosphatase, and gamma-glutamyl transferase (GGT). The effect of gNO on coagulation was determined by the prothrombin time (PT) and its derived measures of prothrombin ratio (PR) and international normalized ratio (INR). Heparinized plasma was collected at baseline and on days 1, 2, 4, and 5 of gNO administration, and on follow-up days 3, 7 and 21 and frozen at −80° C. Plasma cytokine levels were assessed using the human inflammation cytokine bead array kit (BD Bioscience, Canada). Plasma levels of angiopoietin Ang-1 and Ang-2 were determined by ELISA (R&D Systems, USA).

A total of 750 measurements of gNO were recorded during the study. The average inspired gNO was 163.3 ppm (SD=4.0). The highest gNO concentration recorded was 177 ppm. The highest $NO_2$ level recorded during the treatments was 2.8 ppm (mean: 2.32; 95% confidence level: 2.17-2.47 ppm) and none of the subjects experienced a $NO_2$ level higher than 5 ppm. This was consistent with the performance specifications provided by the manufacturer of the apparatus of 1.56 ppm (SD=0.3). Of the 300 recorded oxygen values, the average oxygen level was 22.0% (SD=0.22%).

Data Analysis:

Descriptive statistical characteristics of the subjects prior to, during, and at the end of the study were tabulated and expressed as mean±standard deviation (SD). Differences in continuous variables (methemoglobin, serum nitrites/nitrates and $SpO_2$ levels) over the course of the study were analyzed utilizing repeated measures analysis of variance. Categorical events (number of subjects with a particular adverse event) were determined by constructing 95% confidence limits for their incidence. Differences between continuous variables at two specific times were evaluated with the paired t-test. Categorical events such as clinical pulmonary function and lung diffusion changes, changes in serum inflammatory markers, hematology, clinical chemistry and incidence of adverse events were analyzed by constructing 95% confidence limits for their incidence.

The data were analyzed using the unpaired Mann-Whitney test for comparison between any two groups and ANOVA for repeated measures of variance. Baseline comparisons were analyzed by repeated measures ANOVA with Bonferroni post test for parametric data, or Friedman test with Dunn's post test for non-parametric data.

Data analysis and graphical presentation were done using a commercial statistics package (Graphpad-Prism V 3.0, GraphPad Software Inc., USA).

Unless otherwise specified, $p<0.05$ indicated statistical significance. Results were represented by mean±SD from at least three independent measurements.

Results of Safety Studies:

Medical observation of adverse effects and general safety issues, concerning the repeated delivery of gNO at a concentration of 160 ppm into the airways of 10 healthy adult individuals, was effected by monitoring excessive $NO_2$ levels, while maintaining acceptable arterial hemoglobin oxygen saturation ($SPO_2$). A total of 250 gNO administration procedures were conducted to 10 subjects during the study period. All treatments were well tolerated and no significant adverse events were observed. Three minor adverse events were reported: One subject reported bruising of the arm from multiple attempts to successfully draw blood, while two other subjects reported a numbing sensation of the tongue during gNO administration. This was resolved by instructing the subject to relax and reposition the mouth piece.

During and after gNO administration, all vital signs remained within normal limits for age and with respect to baseline values. Specifically, there was no drop in blood pressure (which could potentially occur due to the vasodilator effect of gNO administration) during or after gNO administration. No sudden incidences of hypoxemia (less than 85% $SpO_2$) were observed during or after gNO administration. The lowest observed $SPO_2$ was 93%. $SPO_2$ levels over time decreased slightly between the pretreatment and post treatment but neither differed significantly statistically nor clinically. ANOVA analysis ruled out that this decrease was associated with the five repeated exposures to gNO over the course of the same day.

Figure 4A:
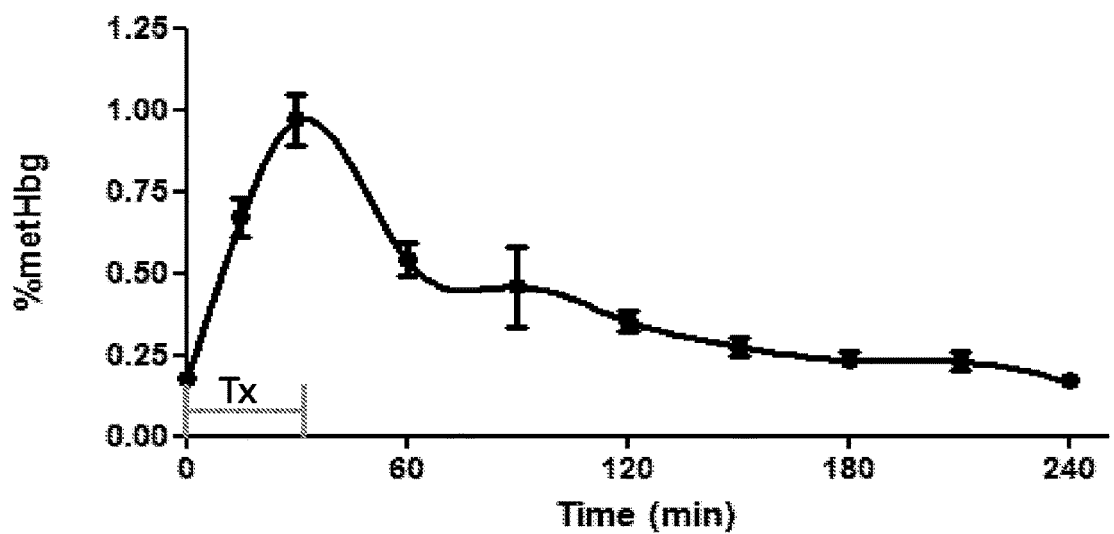
Figure 4B:
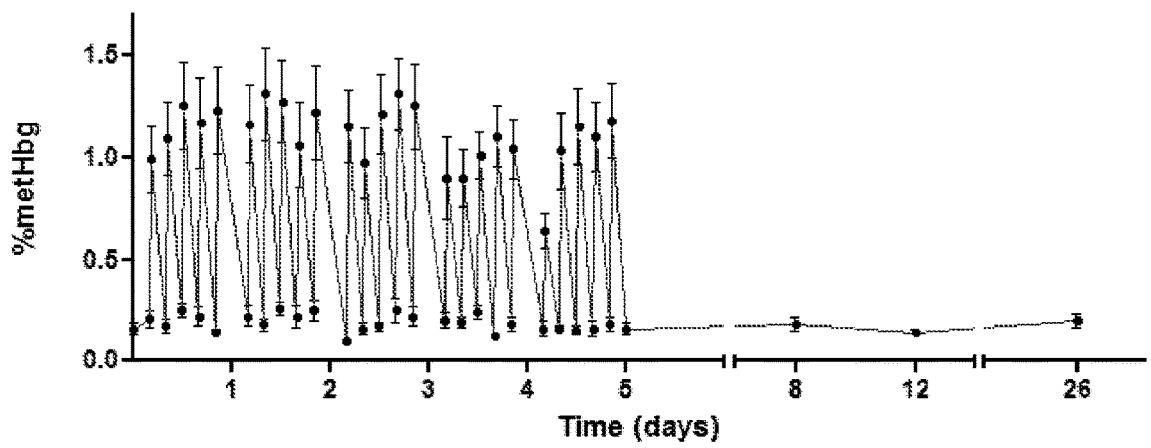

FIGS. 4A-B present results of monitoring methemoglobin levels before, during and after inhalation of 160 ppm of gaseous nitric oxide by 10 healthy human individuals, undergone 5 gNO administration courses daily, each lasting 30 minutes, for consecutive days, while methemoglobin levels were measured using a pulse oximeter, wherein FIG. 4A is a plot of methemoglobin levels by percents as a function of time as measured before (time point 0), during 250 individual 30 minutes gNO administration courses (time interval of 0 to 30 minutes), after the courses (time interval of 30 to 60 minutes) and at 120 minutes, 180 minutes and 240 minutes after gNO administration was discontinued, and FIG. 4B is a plot of methemoglobin levels by percents as a function of time as measured at the beginning and end of 30 minutes gNO administration courses given over the course of 5 days, and followed 8, 12 and 26 days after gNO administration was discontinued.

As can be seen in FIG. 4A, all 930 recorded methemoglobin percent levels (SpMet) remained below the acceptable maximal level of 5%. The initial baseline SpMet was 0.16 (SD=0.10) percent. The highest SpMet was observed at the end of the 30 minutes treatment and was 2.5% with an average increase of 0.9% (SD=0.08). SpMet increased as predicted by about 1% between pretreatment and post treatment (p<0.001) and returned to baseline after 3.5 hours prior to the next gNO administration.

As can be seen in FIG. 4B, ANOVA analysis ruled out that this increase was associated with repeated treatments on the same day, as there was no accumulative or lingering effect on SpMet after five daily treatments for five consecutive days. Follow-up SpMet measurements on 3, 7 and 21 days after the final exposure to gNO on day 5 did not show any residual increase in SpMet.

Methemoglobin is reduced by an enzymatic reductase resulting theoretically in an increase in blood nitrite/nitrate levels. However, no significant differences in serum nitrite/nitrate levels from baseline were observed during the trial. One subject had significantly higher peak nitrite and nitrate values (p<0.001) which was also slightly different at baseline (p=0.038) compared to the other subjects.

There were no statistically, nor clinically significant changes in blood coagulation parameters, clinical chemistry and hematological parameters from baseline to completion of day 5. Although eosinophil cell numbers decreased during the study (baseline 0.15 giga/L; SD=0.12; end of study: 0.19 giga/L (SD=0.19), this difference was not significant (p=0.104). A 1% increase in neutrophil cell numbers from a baseline value of zero to 0.01 giga/L at the end of study was found, which also did not reach statistical nor clinical significance (p=0.169).

Figure 5A:
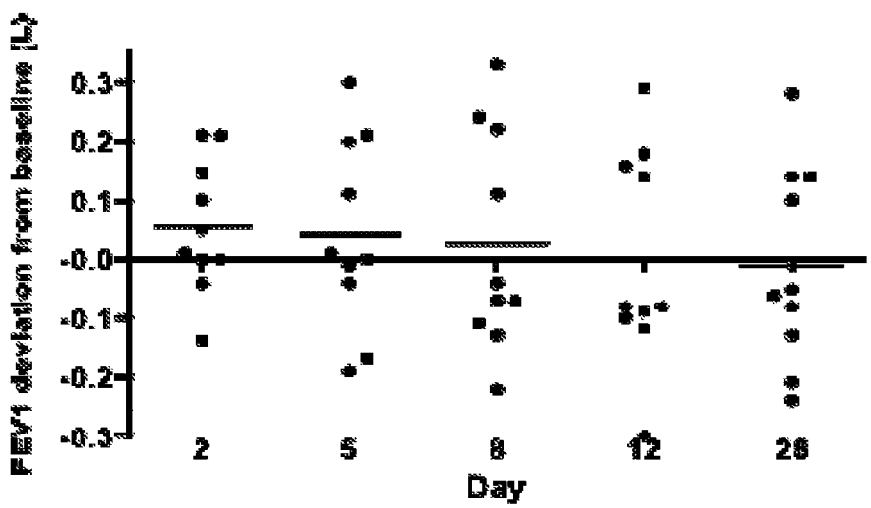
Figure 5B:
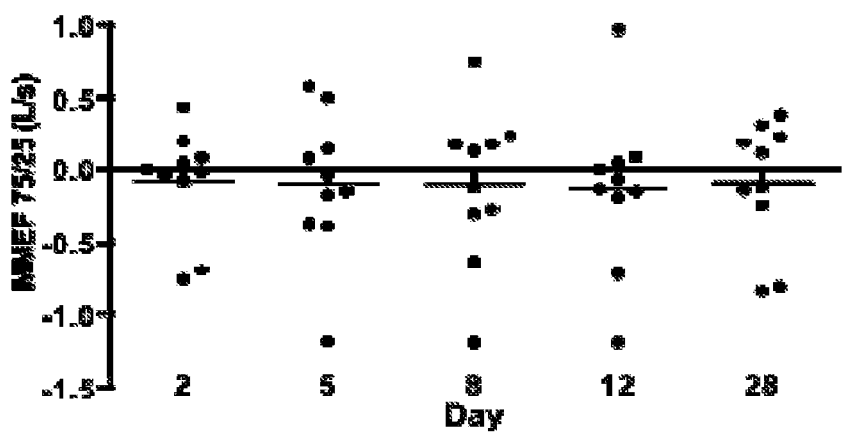
Figure 5C:
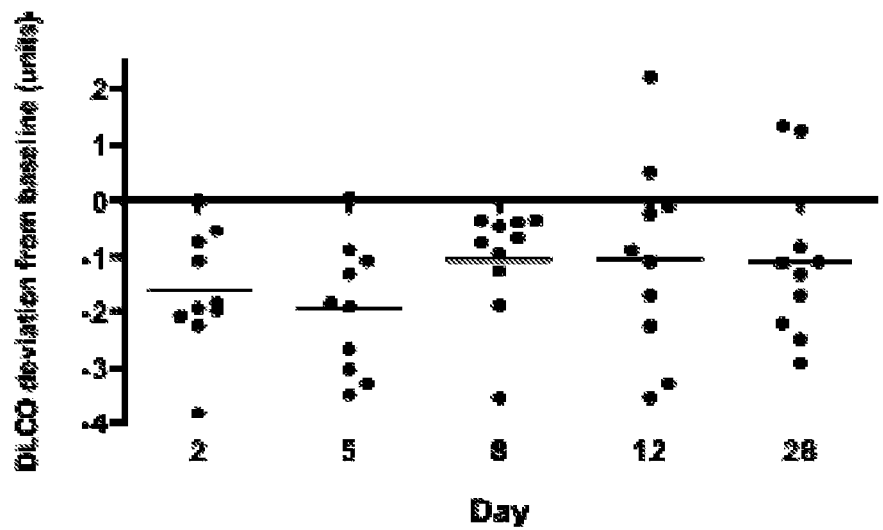
Figure 5D:
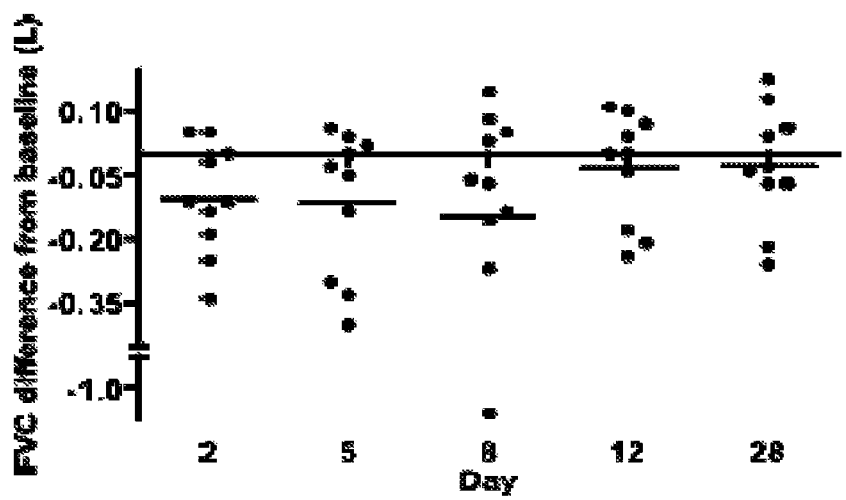
Figure 5E:
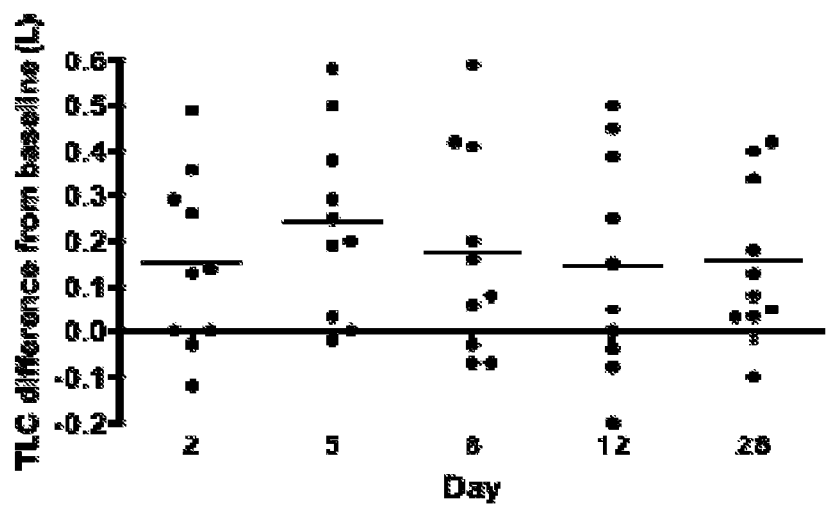
Figure 5F:
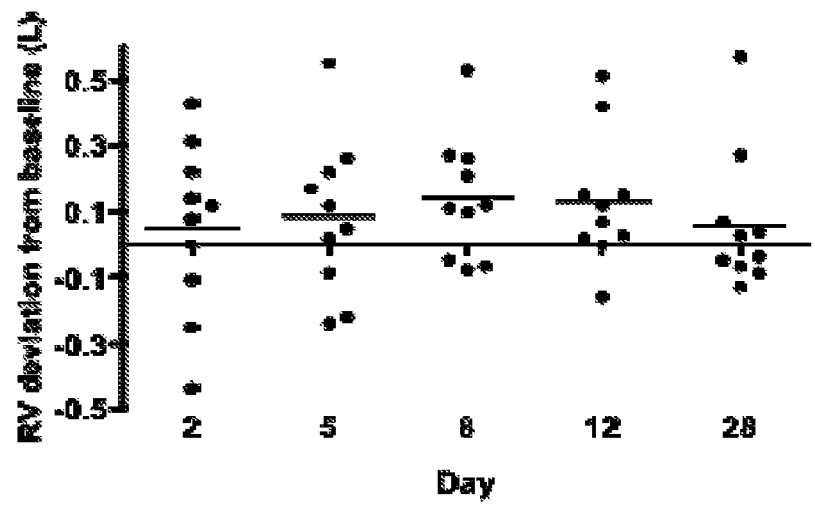

FIGS. 5A-F present various results of monitoring pulmonary function before, during and after inhalation of 160 ppm of gaseous nitric oxide by 10 healthy human individuals, wherein baseline values of pulmonary function tests were obtained within 7 days prior to gNO administration, and values during gNO administration were obtained on day 2 of the 5-days treatment and other data were obtained after the final gNO administration on day 5 and on days 8, 12 and 26, wherein FIG. 5A presents forced expiratory volume in 1 second in percents ($FEV_1$), FIG. 5B presents maximum mid-expiratory flow (MMEF), FIG. 5C presents carbon monoxide diffusing capacity (DLCO), FIG. 5D presents forced vital capacity (FVC), FIG. 5E presents total lung capacity (TLC) and FIG. 5F presents residual volume (RV), while all data are presented as means of all ten subjects and absolute differences compared to baseline prior to gNO administration, and statistical differences were assessed by Mann-Whitney test.

As can be seen in FIGS. 5A-F, pulmonary function tests did not reveal any abnormalities for any subjects during and after gNO administration treatments. Specifically, airflow as measured by $FEV_1$ and maximum mid-expiratory flow (MMEF) did not differ from baseline during the course of the study. Other lung function measurements such as DLCO, forced vital capacity (FVC), total lung capacity (TLC) and residual volume (RV) also did not change from baseline measurement.

To assess whether gNO inhalation may cause inflammation or endothelial activation cytokines and the vascular endothelium activation factors Ang-1 and Ang-2 were quantified in peripheral plasma at baseline at various time points thereafter.

Figure 6A:
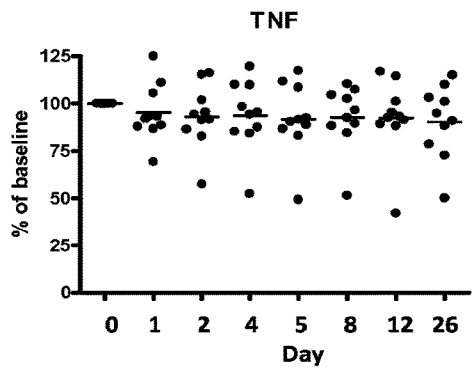
Figure 6B:
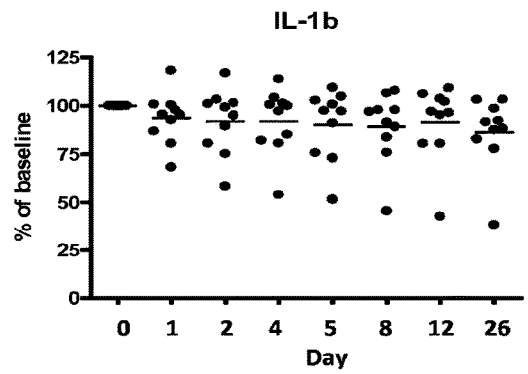
Figure 6C:
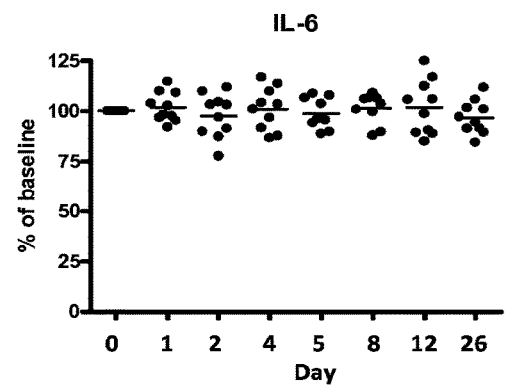
Figure 6D:
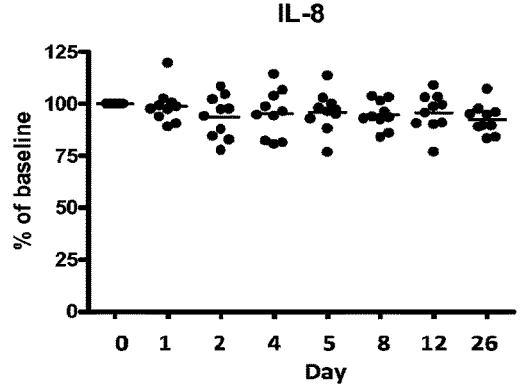
Figure 6E:
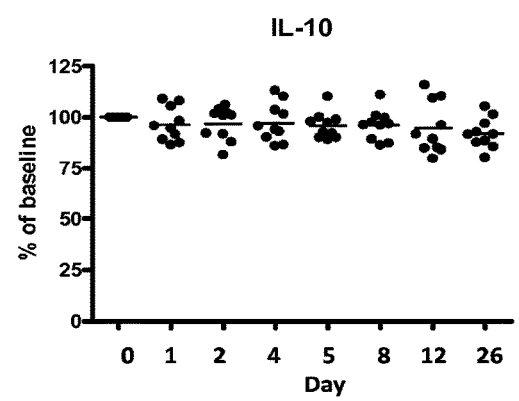
Figure 6F:
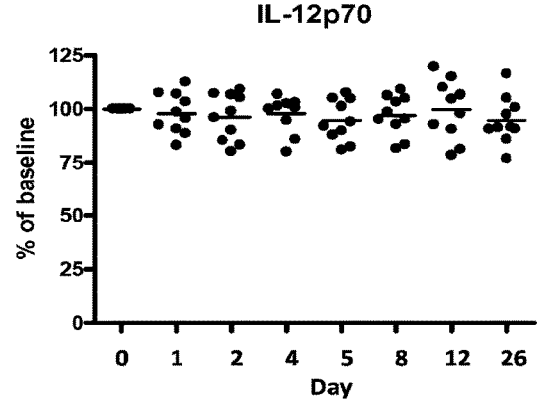

FIGS. 6A-F present blood levels of various cytokines before and after inhalation of 160 ppm gaseous nitric oxide by 10 healthy human individuals, as measured from blood samples collected within 7 days prior to gNO administration, each day during the treatment and 8, 12 and 26 days thereafter, wherein FIG. 6A presents the plasma levels of tumor necrosis factor (TNF)α, interleukin (IL)-1β data is presented in FIG. 6B, IL-6 in FIG. 6C, IL-8 in FIG. 6D, IL-10 in FIG. 6E and IL-12p70 in FIG. 6F, as determined by a cytometric bead array while statistical differences are compared by repeated measures ANOVA with Bonferroni post test for parametric data (IL-6, IL-8, IL-10, IL-12p70), or Friedman test with Dunn's post test for non-parametric data (TNF and IL-1b).

As can be seen in FIGS. 6A-F, cytokine levels of TNF, IL-6, IL-8, IL-10, IL-1b and IL-12p70 were unaffected by inhalation of gNO as compared to baseline. Comparisons between baseline cytokine levels and levels at each of the sampling time points for all 10 human participants resulted in no significant differences, compared by repeated measures ANOVA with Bonferroni post test for parametric data, or Friedman test with Dunn's post test for non-parametric data.

Figure 7A:
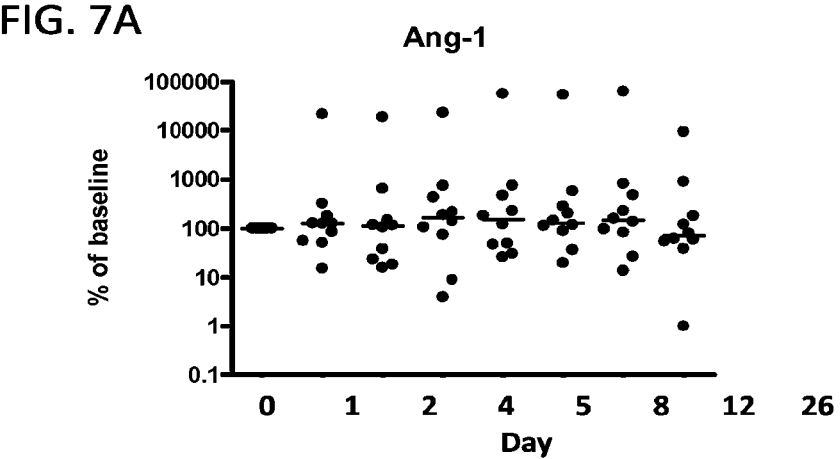
FIGS. 7A-C present plasma levels of angiopoietin (Ang)-1 and Ang-2 before and after inhalation of 160 ppm gaseous nitric oxide by 10 healthy human individuals, as measured in blood sample collected within 7 days prior to gNO inhalation, each day during gNO administration and 8, 12 and 26 days thereafter, wherein plasma levels of Ang 1 are shown in FIG. 7A, Ang-2 in FIG. 7B, and Ang-2/Ang-1 ratios in FIG. 7C, as determined by using a cytometric bead array while statistical differences were assessed compared by Friedman test with Dunn's post test.
Figure 7B:
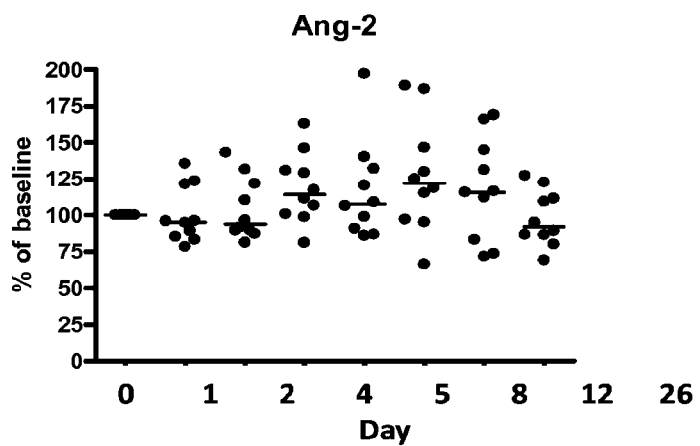
Figure 7C:
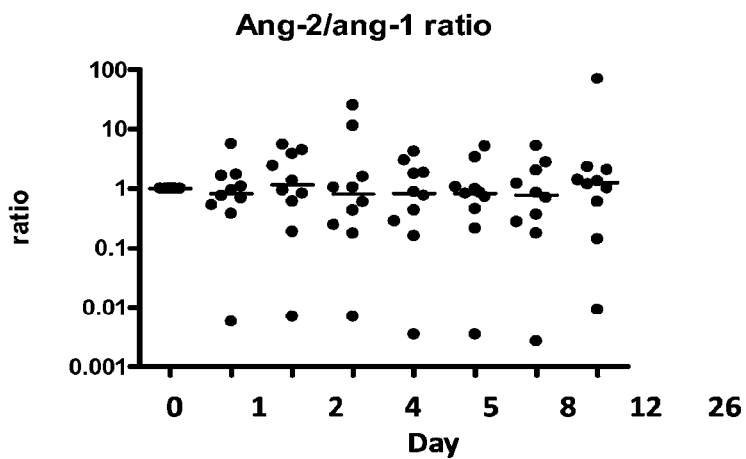

FIGS. 7A-C present plasma levels of angiopoietins Ang-1 and Ang-2 before and after inhalation of 160 ppm gaseous nitric oxide by 10 healthy human individuals, as measured in blood sample collected within 7 days prior to gNO inhalation, each day during gNO administration and 8, 12 and 26 days thereafter, wherein plasma levels of Ang 1 are shown in FIG. 7A, Ang-2 in FIG. 7B, and Ang-2/Ang-1 ratios in FIG. 7C, as determined by using a cytometric bead array while statistical differences were assessed compared by Friedman test with Dunn's post test.

As can be seen in FIGS. 7A-C, Ang-2 and Ang-2/Ang-1 ratios were not affected in this study. Outlier data in FIGS. 7A-C did not show any correlation with changes in any of the other parameters, and thus appears to be isolated findings of unknown significance.

Conclusions:

The safety of a treatment of human by inhalation of gNO at a concentration of 160 ppm, has been demonstrated and presented herein. It has been shown herein that 160 ppm gNO can be safely delivered to healthy human lungs in a pulsed manner for five consecutive days, showing no significant adverse events. All vital signs remained well within acceptable clinical margins during and several days after gNO administration at 160 ppm.

At least with regards to methemoglobin and NO, levels, the findings presented herein are superior to findings obtained for continuous inhalation of 80 ppm gNO, which is the currently approved gNO dose for inhalational use in full term infants, presumably due to the intermittent dosing strategy utilized herein. While continuous delivery of 80 ppm gNO has been reported to cause at least 5% increase of SpMet levels, with 35% of the subjects exceeding 7%, the results presented hereinabove (all 930 recorded SpMet levels) remained below 5%.

While the expected increase in methemoglobin levels during one treatment course was estimated at 1%, the observed average rise of 0.9% methemoglobin for the ten individuals in a single treatment course was consistent with first order pharmacokinetics model estimates, considering the ±1% absolute accuracy of the pulse oximeter. The study established that 3.5 hour interim period allowed the methemoglobin concentration to return to baseline, thereby allowing five daily cycles for five days without a significant clinical increase in methemoglobin concentrations. Taken together, it has been shown herein that intermittent gNO dosing strategy is safe for humans with regard of methemoglobin production and metabolic burden.

Similarly, the mean peak concentrations of $NO_2$ level shown hereinabove (2.8 ppm) is comparable with that observed during continuous delivery of 80 ppm (2.6 ppm) of previous studies. The limitations of this and other studies with regard to gNO delivery are that the NO and $NO_2$ levels are only known at the entry point into the subjects' respiratory tract and the actual resulting levels of oxides of nitrogen in the lung are unknown. Despite this resilience to nitrosative stress, it may well be prudent in future studies to screen subjects for thiol and methemoglobin reductase deficiencies.

The study presented hereinabove also demonstrates that 160 ppm of gNO, delivered as outlined, impacts lung function only minimally, and acute airway inflammation, measured by determining flow rates, was not detectable. Possibly, potential deleterious airway reactivity could be masked or prevented by the ameliorative smooth muscle relaxation that is known to be exerted by gNO. In patients with pulmonary infection, high NO delivery might cause an increase in airway reactivity. However, the vasodilatory activity of NO may benefit the patient in addition to the antimicrobial activity of NO.

The delivery of 160 ppm NO to humans shown herein did not cause lung parenchymal injury, as measured by different lung function parameters. Likewise, plasma inflammatory cytokine levels, the earliest host responses to lung injury, and levels of eosinophils and neutrophils remained constant during and days after gNO inhalation. In addition, the vascular endothelial activation factors Ang-1, Ang-2 and the Ang-2/Ang-1 ratio were unaffected by gNO administration by inhalation.

Pulmonary function mechanics and inflammatory markers remained unchanged compared to baseline values in measurements three days and 28 days post treatment by gNO administration. While it cannot be exclude that some longer term change may occur in lung function, the absence of any sign of inflammation in the post treatment period shown hereinabove makes this unlikely. If serum inflammatory markers may prove insensitive to measure acute or even chronic changes in the lungs, inflammatory markers from bronchoalveolar lavage (BAL) fluids could be sampled.

Example 4

Treatment of Bronchiolitis in Infants Using gNO

The following is a protocol for testing the efficacy and for treating infants suffering from viral bronchiolitis. Each patient is enrolled by the research physician, and a parental informed consent signature is obtained in an official document. A detailed questionnaire is filled by the physician and blood and nasopharyngeal samples for respiratory viruses are obtained.

Indication and Prognosis:

Bronchiolitis is defined as an infection of the small airways. It is also one of the most common manifestations of acute lower respiratory system infection in early infancy, and is the leading cause of global child mortality. In 2005 it has been estimated that 2.8 to 4.3 million young children worldwide developed RSV-associated severe ALRI necessitating hospital admission. Hospitalization for bronchiolitis is expensive with US hospital charges alone exceeding $1 billion in 2006. These charges in part reflect length of stay (LOS) in the hospital. The mean LOS for bronchiolitis in the United States is 3.3 days.

Bronchiolitis, which includes conditions associated with pathogenic viruses, bacteria, fungi or other irritants, is currently the most common reason for pediatric hospital admission in the United States, accounting for almost 20% of all-cause infant hospitalizations. Viral etiology is the main cause and among the respiratory viruses, respiratory syncytial virus (RSV) is believed to be the most important viral pathogen causing acute lower respiratory infection (ALRI) in young children. It is estimated that 60,000 to 199,000 children younger than 5 years die yearly from RSV-associated ALRI, with 99% of these deaths occurring in developing countries. The disease is common mainly in the first year of life. The clinical signs and symptoms are consistent with hypoxia, difficulty in breathing, coryza, poor feeding, cough, wheeze and crepitations on auscultation and in some cases respiratory failure.

Current Treatment of Acute Bronchiolitis:

No specific treatment is available hitherto for the viral infection and only supportive treatment such as oxygen and inhalations of hypertonic saline or steroids with or without beta agonist drugs are being used to date.

Infants with hypoxemia are admitted for oxygen supplementation and supportive treatment. The administration of oxygen and fluids are the cornerstone of the treatment of acute viral bronchiolitis. To date, all other interventions, including inhaled bronchodilators, corticosteroids, chest physiotherapy, anti-viral agents, and antibiotics are not proven to be effective, and are not routinely recommended for the treatment of acute viral bronchiolitis.

Disease Related Conditions:

Respiratory viruses are often responsible for the bronchiolitis manifestation, which is caused, exacerbated thereby or otherwise associated therewith. Among them the most common are respiratory syncytial virus (RSV), rhinovirus, coronavirus, enterovirus, influenza A and B, parainfluenza 1, 2 and 3, bocavirus, human metapneumovirus, SARS and adenovirus. However, other viruses and other pathogens often cause infections that are manifested by bronchiolitis, and, in addition, bronchiolitis can occur as a result of conditions which are not associated with any pathogen (e.g., cystic fibrosis complication complications, cancer related immunosuppression, and various lung disease, etc.).

Safety and Adverse Effects:

The observational objectives of the treatment with gNO of infants 2-12 months old suffering from bronchiolitis include:
  Assessment of clinical outcome;
  Assessment of off-site parameters such as white blood cells counts; and
  Assessment of respiratory viral load in the nasopharynx.
Any adverse event is documented and serious adverse events are addressed according to established protocols, the gNO treatment is ceased and the event is reported to the relevant party.

Cohort Definition:
  The cohort (case) definition fulfills the following criteria:
  Infants 2-12 months old;
  Diagnosed with bronchiolitis (respiratory distress with hypoxia);
  No concomitant diseases such as pneumonia or otitis media;
  No antibiotic treatment has been prescribed or needed;

Clinical score between 6-10 (see detailed description hereinbelow);

No underlying diseases; and

Documented informed parental consent.

An underlying disease is one such as genetics disorders or chronic lung diseases.

Regimen:

Infants 2-12 months old which are admitted to the pediatric ward due to bronchiolitis are subjected to gNO treatment according to the regimen described in Example 3 hereinabove, namely, to inhalation of 163.3 ppm (SD of 4.0) gNO for 30 minutes, 5 times daily, for 5 consecutive days or until discharged, which occurs first.

The enrolled infants can be randomized in a 1:1 or 1:2 ratio to receive gNO with $O_2$ or Placebo (air) with $O_2$.

Clinical Score:

Table 3 presents the various criteria and scoring attributed to each observation, which is then summed up to obtain a clinical score.

TABLE 3

| score | <6 months | ≥6 months | Wheezing | $SaO_2$ (room air) | Use of accessory muscle |
|---|---|---|---|---|---|
| 0 | 40 | 30 | None | ≥95% | |
| 1 | 41-55 | 31-45 | End expiration audible by stethoscope | 92-94% | + |
| 2 | 56-70 | 46-60 | Inspiration & expiration audible by stethoscope | 90-92% | ++ |
| 3 | >70 | >60 | Audible without stethoscope [2] | ≤89% | +++ |

Clinical score is considered mild if ≤5; moderate at 6-7; and severe at 11-12. If wheezes is not audible due to a minimal air entry, it is attributed a score of 3.

Monitored Parameters:

Clinical monitoring is carried our by recording a clinical score by a physician twice daily. Oxygen saturation in room air is recorded three times a day.

Off-site laboratory monitoring is performed before and during treatment and includes blood levels of methemoglobin, serum nitrites/nitrates, prothrombin, pro-inflammatory cytokines and 18 chemokines.

Table 4 presents the schedule for various protocol activities.

TABLE 4

| Activity | Treatment day count | | | | | | | | |
|---|---|---|---|---|---|---|---|---|---|
| | 0 | 1 | 2 | 3 | 4 | 5 | 6 | 10 | 30 |
| Enrollment and informed consent | + | | | | | | | | |
| Questionnaire | + | | | | | | + | | |
| gNO inhalation regimen | + | + | + | + | + | + | | | |
| Blood tests for WBC count, CRP, serum nitrites/nitrates and prothrombin, | + | | + | | | | | + | + |
| Blood levels of methemoglobin | + | + | + | + | + | + | | + | + |
| Nasopharyngeal wash for respiratory viruses | + | | + | | | | | | |
| Blood levels for pro-inflammatory cytokines and chemokines | + | | + | | | | | + | + |
| Clinical score assessment | + | + | + | + | + | + | + | + | + |

Criteria for Efficacy:

The treatment is assessed by determining the rate of improvement of the clinical score, reduction of the length of hospitalization, rate of improvement of $O_2$ saturation, and rate of referral to a pediatric intensive care unit.

In addition, a reduction in viral load in the nasopharynx, determined by RT-PCR, is used to assess efficacy.

Example 5

Treatment of Bronchiolitis in Infants Using gNO—Clinical Study Protocol

The following is an exemplary protocol for clinical studies based on the methods according to embodiments of the present invention, aimed at treatment of bronchiolitis in humans. Specifically, the topic of the study is a randomized double blind evaluation of efficacy, safety and tolerability of nitric oxide given intermittently via inhalation to subjects with bronchiolitis.

The objectives of the study include the assessment of safety and tolerability of gNO intermittent inhalation treatment in 2-12 month old infants suffering from bronchiolitis. Other objectives include the assessment of efficacy of gNO intermittent inhalation treatment compared with standard treatment using $O_2$ in a group of similar subjects.

Equipment:

An improvised inhalation device is based on standard hospital equipment and hospital oxygen source. For example, oxygen is supplied from the main hospital oxygen system via an oxygen blender, such as for example, Bird model 03800, followed by a hospital's oxygen mass flow meter. The oxygen-rich air is monitored so as to reach a maximal final concentration of about 40% $O_2$. The blended air/oxygen is supplied to the subject via a Y-shape connector attached next to a standard hospital face mask such as for example, a Hospiltak mask by Unomedical Inc.

gNO flow, tapped from a tank containing 800 ppm nitric oxide in 99.999% pure $N_2$, supplied by an authorized gas provider in, for example, 50 or 30 litter containers with 120 bar or 150 bar respectively, is adjusted by passing through a standard hospital's regulator, such as for example CareFusion™ model 400, and the hospital mass flow meter, such as a CareFusion™ model 77063.

NO accountability cannot be checked directly since several subjects may receive NO from the same container, and the net amount of NO used for each inhalation is minimal comparing to the total container weight. The amount of NO given per treatment is therefore evaluated based on pressure changes in the container (a rough evaluation).

The gNO flow is adjusted before each inhalation cycle based on the gNO concentration detected in the subject's mask. After a fresh system calibration, the regulator and the mass flow meter are adjusted to deliver 160 ppm of gNO at 5 to 15 liters per minute. gNO is supplied to the subject via the second arm of the Y shaped connector (specified above) attached next to the face mask. Mask and tubing ports are used to monitor continuously gNO and $NO_2$ concentrations and $FiO_2$ values delivered to the subject.

Halitus (exhalation) is monitored by, for example, end-tidal $CO_2$ ($EtCO_2$). $EtCO_2$ is monitored using standard equipment such as Microcap® Portable Capnography Monitor, Cat.#CS04179 by Oridion, Israel, with nasal prongs such as (Infant Neonate Cat.#008179 by Oridion, Israel.

Methemoglobin (SpMet) and oxygen saturation or dissolved oxygen ($SpO_2$) levels are monitored continuously using a dedicated monitor such as for example RAD 57 by Masimo.

Cohort:

The population for the study is 44 children of 2-12 months old diagnosed with bronchiolitis, whom required hospitalization (expected dropout rate is 10%). The population is split into two groups: Group 1, referred to as the treatment group, receives intermittent (5×30 minutes, a day) inhalation of 160 ppm gNO in addition to the standard treatment of $O_2$ administration, for up to 5 days. Between gNO inhalations, the subjects continue to receive the standard inhalation treatment ($O_2$). Group 2, referred to as the control group, receives continuous inhalation of the standard treatment ($O_2$).

Table 5 presents clinical score calculation, wherein a score lower than 5 is mild; 6-10 is moderate, and 11-12 is severe, 11-12. In a score of 2, if wheezes are not audible due to a minimal air entry, it is considered a score of 3.

TABLE 5

| Score | <6 months | ≥6 months | Wheezing | SaO₂ (room air) | Accessory muscle use |
|---|---|---|---|---|---|
| 0 | 40 | 30 | None | ≥95% | None |
| 1 | 41-55 | 31-45 | End expiration With Stethoscope | 92-94% | + |
| 2 | 56-70 | 46-60 | Insp. & Expiration With stethoscope | 90-92% | ++ |
| 3 | >70 | >60 | Audible without Stethoscope | ≤89% | +++ |

Inclusion criteria are defined as male or female 2-12 months old, diagnosed with bronchiolitis at a clinical score of less than 10 (see below), and informed consent by parents/legal guardian.

Exclusion criteria include: diagnosis of concomitant diseases such as pneumonia, urinary tract infection or otitis media; prematurity of less than 36 weeks gestational age; subject receiving RSV immunoglobulin prophylaxis; diagnosis of methemoglobinemia, chronic lung disease, immunodeficiency or heart disease; subject use of an investigational drug within 30 days before enrolment and not expected to participate in a new study within 30 days; history of frequent epistaxis of more than 1 episode per month; significant hemoptysis within 30 days of more than 5 ml of blood in one coughing episode or more than 30 ml of blood in a 24 hour period; methemoglobin of more than 3% at screening; inability to fulfill the study design; presence of a condition or abnormality that in the opinion of the investigator would compromise the safety of the subject or the quality of the data; underlying diseases such as genetic disorders, such as cystic fibrosis or Down syndrome or chronic lung diseases such as bronchopulmonary dysplasia, primary ciliary diskynesia, bronchiolitis obliterans, hypotonia or congenital heart disease.

Regime, Route and Dosage Form of Administration:

The duration of the study for each subject is 30 (+5) days from admission to the department, through the treatment, including the follow up period. All subjects show up for follow up visits on day 14 (+5 days) and are contacted on day 30 (+5 days) from day of admission.

Table 6 presents an exemplary study's assessment activity schedule, wherein (*) denotes treatment for 5 days or until subject discharge (whichever comes first), () denotes treatment on day 5 or at subject discharge (whichever comes first), in the morning, (*) denotes treatment by blinded study physician, and (****) denotes treatment in case the 5th treatment day is the 6th day from admission to the study.

TABLE 6

| | Day 1- | Day 1- 1ˢᵗ Study inhalation | Day 2 | Day 3 | Day 4 | Day 5 | Day **** 6 | Day 14 (+5) | Day 21 (+5) | Day 30 (+5) |
|---|---|---|---|---|---|---|---|---|---|---|
| Admission Screening, signing informed consent and Enrollment | + | Within 4 hours from admission | | | | | | | | |
| Randomization | | + | | | | | | | | |
| Physical exam*** | | + | | +* | +* | +* | +* | +* | + | + |
| Clinical score assessment (twice a day morning + evening)*** | | + | + | +* | +* | +* | +* | +* | + | + |
| Vital signs (once per shift) | | + | + | +* | +* | +* | +* | +* | + | + |
| Study (NO/control) treatment | | | + | +* | +* | +* | +* | +* | | |

TABLE 6-continued

| | Day 1- | Day 1- 1st Study inhalation | Day 2 | Day 3 | Day 4 | Day 5 | Day **** 6 | Day 14 (+5) | Day 21 (+5) | Day 30 (+5) |
|---|---|---|---|---|---|---|---|---|---|---|
| Blood tests: % methemoglobin; % oxyhemoglobin; Heart rate (every inhalation treatment x5/24 hours)* | + | + | +* | +* | +* | +* | +* | | | |
| NO, NO$_2$, FiO2 levels from the mask | + | + | +* | +* | +* | +* | +* | | | |
| ETCO2 level from the nasal prongs located in the subject nostril | + | + | +* | +* | +* | +* | +* | | | |
| Nasopharyngeal and oropharyngeal swabs for *Streptococcus pneumoniae*, *Haemophilus influenzae* and *Staphylococcus aureus* | + | | +* | +* | +* | +* | +* | + | + | |
| Nasopharyngeal wash for respiratory viruses + PCR | + | | | | | | | | | |
| Questionnaire for all adverse effects | + | + | + | + | + | + | + | + | + | +/phone |
| Concomitant medication | + | + | +* | +* | +* | +* | +* | + | + | + |
| Document all lab tests done for medical reasons | + | + | +* | +* | +* | +* | +* | + | + | + |

Table 7 presents the gNO administration and assessment schedule, wherein (±) denotes activity on the first inhalation on the first day of treatment.

TABLE 7

| | Pre-treatment | Study Treatment start | During Study treatment | Study Treatment end | | | | | |
|---|---|---|---|---|---|---|---|---|---|
| | | | | Time | | | | | |
| | | 0 - min | | 30 min | 60* min | 90* min | 120* min | 180* min | 210* min |
| Subject eligibility | + | | | | | | | | |
| NO cylinder pressure | | + | | + | | | | | |
| Standard O$_2$ treatment | + | + | + | + | + | + | + | + | + |
| NO treatment (Group 1) | | Start | ongoing | End | | | | | |

TABLE 7-continued

|  | Pre-treatment | Study Treatment start | During Study treatment | Study Treatment end Time | | | | | |
| --- | --- | --- | --- | --- | --- | --- | --- | --- | --- |
|  |  | 0 - min |  | 30 min | 60* min | 90* min | 120* min | 180* min | 210* min |
| OxyHem + MethHem measure - % | + | + | Ongoing, record the value observed in case exceeding the approved range | + | + | + | + | + | + |
| Heart Rate |  | + | 15 min after the start of the treatment | + | + | + | + | + | + |
| NO + NO$_2$, FiO2, levels taken from the mask | + | + | Ongoing, record the value observed in case exceeding the approved range | + |  |  |  |  |  |
| ETCO$_2$ level taken from the nasal prongs located in the subject nostril | + |  |  | + |  |  |  |  |  |
| all adverse effects | + | + | + | + | + | + | + | + | + |
| Concomitant medication | + | + | + | + | + | + | + | + | + |

Treatment blindness is kept by separating between unblinded team members giving the actual treatment and blinded team members, and by hiding the NO container/source and all study related equipment behind a curtain.

Group 1 (treatment group) receives the standard treatment ($O_2$) combined with the inhalation via face mask of 0.08% gaseous nitric oxide (gNO, 800 ppm) administered for 30 minutes every four hours, keeping a minimum of 3 hours between the end of one gNO inhalation cycle and the beginning of the next cycle, five times a day for five consecutive days or until a decision to discontinue therapy. The maximal cumulative exposure to nitric oxide is estimate at 2,000 ppm hours. Group 2 (control group) receives standard treatment of $O_2$ inhalation with the identical equipment as used to administer gNO to members of Group 1.

The end of study treatment for both groups is assessed by a "blinded" study physician based on clinical assessment. Subject improvement may lead to a decision of subject discharge from the study.

Considering an expected dropout rate of approximately 10%, 44 subjects are recruited, in order to have a sample size of at least 40 (20 per group) subjects who completed the study.

Study Endpoints:

Primary safety end points include determining the methemoglobin (MetHb) percentage associated with inhaled gNO, and determining adverse events associated with inhaled gNO.

Primary tolerability end points include proportion (%) of subjects whom prematurely discontinued the study for any reason, and proportion (%) of subjects whom prematurely discontinued the study due to adverse effects.

Secondary efficacy end points include the comparison of the length of hospital stay (LOS) in days of subjects 2-12 months old diagnosed with bronchiolitis which were treated with gNO and standard treatment versus subjects treated with standard treatment; the comparison of the rate of clinical score improvement of subjects 2-12 months old diagnosed with bronchiolitis which were treated with gNO and standard treatment versus subjects treated with standard treatment; and the comparison of the length of oxygen treatment in hours of subjects 2-12 months old diagnosed with bronchiolitis whom been treated with gNO and standard treatment versus subjects treated with standard treatment.

Observational end points include observation of the number of subjects with MetHb level higher than about 5% at any time point; observation of the change in the mean neutrophil and eosinophil counts of subjects 2-12 months old whom been treated with gNO for bronchiolitis versus subjects treated with standard treatment, observation of the number of subjects with study drug related bleeding at any time point; observation of the reduction of bacterial carriage in the nasopharynx of *S. pneumoniae*, *H. influenzae*, *S. Aureus* and the assessment of clinical outcome during 21 days from admission to the study of subjects 2-12 months old treated with gNO for bronchiolitis; and the assessment of off-site parameters such as white blood cell counts in subjects 2-12 months old treated with gNO for bronchiolitis versus subjects treated with standard treatment.

Criteria for treatment end due to subject improvement are based on the subject's improvement that leads to a decision of subject discharge from the hospital.

Criteria for early temporary treatment discontinuation include:

Blood methemoglobin more than 5%;
NO$_2$ level measured near subject's mouth more than 5 ppm;

SpO$_2$ during treatment more than 90%;
ETCO$_2$ of more than 60 mmHg; and
Adverse effects that are suspected to be NO related, according to physician discretion.

In any event that a measured parameter exceeds the approved level, the current study treatment inhalation is be stopped. A repeat level is then measured 30 minutes later and the final measurement is recorded. The next inhalation starts according to study protocol.

Criteria for early permanent treatment discontinuation include:
A second episode of blood methemoglobin more than 5%; and
A clinical score of more than 10.

A subject whose treatment was discontinued for any reason except voluntary parent/legal guardian consent withdrawal, completes all study assessment including the follow up visits.

Concomitant medication (i.e. antibiotics or steroids) given during the study are not be held as a reason for treatment early discontinuation.

Criteria for early study withdrawal include:
Subject's parent/legal guardian withdrew consent;
Study management requested subject to be withdrawn;
Investigator's discretion;
Protocol violation/non-compliance;
Loss to follow-up/failure to return;
Adverse event or serious adverse event; and
Death; in which case the study is stopped for all cohort member for medical re-evaluation.

Treatment Procedures:
Day 1:
Up to 5 inhalations depending on time of admission.
Pretreatment includes monitoring and recording levels of oxyhemoglobin (%), methemoglobin (%), EtCO$_2$, FiO$_2$, NO and NO$_2$. A baseline for gas flow is established to match patient's minute ventilation (5-15 Lpm), and the gNO flow is validated to achieve 160 ppm in the inhalation mask, with fluctuating not exceeding 15 ppm. If gNO is fluctuating, baseline gas flow is increased to meet patient's minute ventilation and flow demands. At the end of the pretreatment stage the mask is placed on the subject's face.

At treatment start the following parameters are recorded:
Start time and cylinder pressure;
heart rate;
Oxyhemoglobin (%) and methemoglobin (%); and
FiO$_2$, NO and NO$_2$ levels.

During treatment the following parameters are monitored and recorded continuously:
Oxyhemoglobin (%) and methemoglobin (%);
FiO$_2$, NO and NO$_2$ levels taken from the mask;
Any form of adverse effects; and
heart rate 15 min after the start of the treatment.

Treatment ends 30 minutes after the start of treatment, and the following is recorded:
Stop treatment time and cylinder pressure;
Any form of adverse effects;
FiO$_2$, NO and NO$_2$ levels;
Heart rate;
Oxyhemoglobin (%) and methemoglobin (%) levels;
Only after the first inhalation of the first day for both groups, the following is recorded:
Oxyhemoglobin (%), methemoglobin (%) and heart rate 60, 90, 120, 150, 180 and 210 minutes after the start of treatment;

Questionnaire including all adverse effects is completed by the study coordinator and study physician, and vital signs are measured once per shift.

Days 2-5 (or Day 6):
The last day of treatment is the 6th day from admission.
On Day 5 (or Day 6, if the 5th treatment day ends on the 6th day from admission or discharge day/last day of study treatment) up to 5 inhalations, according subject clinical status.

Once a day in morning physical examination is performed vital signs are recorded (including temperature, pulse, respiratory rate, blood pressure etc.);
Assessment of clinical score by a blinded physician; and
Detection of bacteria by culture from nasal swab (Nasopharyngeal and oropharyngeal swabs for *Streptococcus pneumoniae, Haemophilus influenzae* and *Staphylococcus aureus*).

On a routine basis questionnaire including all adverse effects is completed by the study coordinator and study physician, and the subject is observed so as to meet inclusion and exclusion criteria.

Pretreatment, treatment start, during treatment and end of treatment procedures are conducted as in Day 1.

End of treatment assessments are made 2-4 hours after last inhalation treatment, and include assess clinical score, vital signs by a blinded physician, oxyhemoglobin (%) and methemoglobin (%), detection of bacteria by culture from nasal swab.

Scheduled Follow up Visits:
Days 14+5 and 21+5:
Questionnaire including any adverse effects is completed by the study Physician;
Review and document concomitant medications;
Physical examination by the study physician;
Assess clinical score by a blinded physician;
Perform detection of bacteria by culture from nasal swab;
Record in subject study file any lab tests (i.e., blood tests and chest x-ray) if taken for clinical reasons.

Day 30+5:
Questionnaire including any adverse effects is completed by the study physician;
Review and document concomitant medications.

Medical/Clinical Assessment:
Initial demography/medical history form is filled, and a physical examination is performed. A physical examination is performed by a physician at the screening day and during follow up visits. Body systems which are examined grossly include general, skin, lymph nodes, head, eyes, ears, nose and throat, respiratory, cardiovascular, gastrointestinal, neurologic and muscoskeletal. New abnormal findings are documented and followed by a physician at the next scheduled visit.

An abbreviated physical examination is performed as deemed necessary by the investigators. In addition to vital signs, body systems to be examined grossly. Vital signs measurements after resting for 5 minutes, including heart rate, blood pressure, respiration rate and temperature, are performed and recorded three times a day.

Oxygen saturation (SpO$_2$) is measured by pulse oximetry (using e.g., RAD 57) during each treatment and recorded before, during and after NO treatment. In any event that SpO$_2$ level during treatment is less than about 89%, the current study treatment inhalation is stopped. A repeat level is measured 30 minutes later and the final measurement should be recorded. The next inhalation starts according to study protocol.

Methemoglobin levels are measured non-invasively and continuously using a pulse methemoglobinometer during treatment and recorded before, during and after on Day 1 through Day 5. Any methemoglobin level of more than about 5% requires a repeat measurement 30 minutes later, and the final measurement is recorded. The next inhalation starts according to study protocol.

End-tidal $CO_2$ (Et$CO_2$) is measured using, e.g., MicroCap Capnograph and recorded before and after treatment on Day 1 through Day 5.

Information regarding occurrence of adverse effects or events is documented throughout the study and until 30 day subjects follow up is complete. Event duration (start and stop dates and times), severity, outcome, treatment and relation to study medication (causality) and if the event is regarded as a severe adverse event, is recorded in the case report form. Adverse effect or events are monitored until day 30 follow up visit/call.

Concomitant medication given during the study does not lead to study treatment discontinuation. All concomitant medications and concurrent therapies are documented throughout the study until day 30 follow up visit/call. The following information is recorded: dose, route, unit frequency of administration, and indication (if deemed relevant) for administration of medication. The reason for administration of concomitant medications is considered as an adverse effect or event unless it was scheduled prior to study start.

Any laboratory tests results received during subject's hospitalization or study follow up are recorded in the subject file and used for observational analysis.

Nasal wash for determination of viral shedding is collected in a sterile specimen cup. Nasal swab (nasopharyngeal and oropharyngeal) for determination of bacteria (*Streptococcus pneumoniae, Haemophilus influenzae* and *Staphylococcus aureus*) is collected in a sterile specimen cup.

Adverse Effects or Events:

Adverse events are recorded from the date of subject's signed informed consent form and throughout the study, including the follow-up period. Adverse events should be reviewed and updated at each subsequent visit and during any phone contact with the subject. The intensity or severity of adverse event is characterized as mild if it is easily tolerated, moderate if it is sufficiently discomforting to interfere with daily activity, and severe if it prevents normal daily activities.

The causality of the adverse event is assessed as:

Unrelated when the adverse event is clearly and incontrovertibly due to extraneous causes (disease, environment, etc.);

Unlikely related if the adverse event meets at least two of the following criteria: it does not follow a reasonable temporal sequence from study-drug administration; it could readily have been produced by the subject's clinical state, environmental or toxic factors or other modes of therapy administered to the subject; it does not follow a known pattern of response to the study-drug, and does not reappear or worsen when the drug is re-administered;

Possibly related if the adverse event meets at least two of the following criteria: it follows a reasonable temporal sequence from study-drug administration; a causal relationship to the experimental treatment cannot necessarily be reasonably excluded and an alternative explanation (e.g., concomitant drug or concomitant disease) cannot be reasonably suggested as causing the SAE; and it follows a known pattern of response to the study-drug;

Probably related if the adverse event meets at least three of the following criteria: it follows a reasonable temporal sequence from study-drug administration; it cannot be reasonably explained by the known characteristics of the subject's clinical state, environmental or toxic factors or other modes of therapy administered to the subject; it disappears or decreases on cessation or reduction of the drug dose, and it follows a known pattern of response to the study-drug.

Potentially NO related adverse events are those which are associated with methemoglobinemia (% methemoglobin elevation) of more than 5%, and $NO_2$ elevation of more than 5 ppm.

Data Processing and Statistical Considerations:

For categorical variables summary tables are created, giving sample size, absolute and relative frequency and 95% confidence interval for proportions by study group.

For continuous variables summary tables are provided, giving sample size, arithmetic mean, standard deviation, coefficient of variation (if appropriate), median, minimum and maximum, percentiles and 95% confidence interval by study group for means of variables.

Chi-square test or Fisher's Exact test are applied for testing difference in proportions between the study groups.

Adverse events are coded according to coding dictionaries such as Medical Dictionary for Regulatory Activities (MedDRA version 14.0 or higher) and presented in tables by System Organ Class (SOC) and Preferred Term (PT).

95% confidence interval (CI) is calculated for the proportion of subjects having adverse effects associated with inhaled gNO.

The Paired T-test or Signed rank test for two means are applied for analyzing changes in continuous parameters within each study group.

The two-sample T-test or Non-parametric Wilcoxon-Mann-Whitney Rank sum test for independent samples are applied for analyzing differences in continuous parameters between the study groups.

All tests are two-tailed, and a p-value of 5% or less is considered statistically significant.

The data are analyzed using data processing software such as the SAS® version 9.1 (SAS Institute, Cary N.C.).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

The invention claimed is:

1. A method of treating an infant suffering from bronchiolitis associated with respiratory syncytial virus (RSV), the method comprising administering to the infant via inhalation at least 160 ppm±10% gaseous nitric oxide (gNO) for 30 minutes, 5 times per day for up to 5 days, wherein there is a time period from 3 to 5 hours between gNO administrations.

2. The method of claim 1, wherein the infant is an immuno-compromised infant.

* * * * *